US011481560B2

(12) United States Patent
Nishida et al.

(10) Patent No.: US 11,481,560 B2
(45) Date of Patent: Oct. 25, 2022

(54) INFORMATION PROCESSING DEVICE, INFORMATION PROCESSING METHOD, AND PROGRAM

(71) Applicant: NIPPON TELEGRAPH AND TELEPHONE CORPORATION, Chiyoda-ku (JP)

(72) Inventors: Kyosuke Nishida, Yokosuka (JP); Itsumi Saito, Yokosuka (JP); Atsushi Otsuka, Yokosuka (JP); Hisako Asano, Yokosuka (JP); Junji Tomita, Yokosuka (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 141 days.

(21) Appl. No.: 16/767,397

(22) PCT Filed: Oct. 5, 2018

(86) PCT No.: PCT/JP2018/037482
§ 371 (c)(1),
(2) Date: May 27, 2020

(87) PCT Pub. No.: WO2019/106965
PCT Pub. Date: Jun. 6, 2019

(65) Prior Publication Data
US 2021/0374350 A1 Dec. 2, 2021

(30) Foreign Application Priority Data

Dec. 1, 2017 (JP) .............................. JP2017-232189
Dec. 5, 2017 (JP) .............................. JP2017-233745

(51) Int. Cl.
*G06N 3/04* (2006.01)
*G06F 40/30* (2020.01)
(Continued)

(52) U.S. Cl.
CPC .............. *G06F 40/30* (2020.01); *G06F 16/93* (2019.01); *G06F 40/279* (2020.01); *G06N 3/0454* (2013.01); *G06N 3/08* (2013.01)

(58) Field of Classification Search
CPC .................................................. G06N 3/0454
See application file for complete search history.

(56) References Cited

U.S. PATENT DOCUMENTS

2016/0155058 A1* 6/2016 Oh .......................... G06N 20/00
706/11
2019/0042892 A1* 2/2019 Wolf .................... G06V 10/454

FOREIGN PATENT DOCUMENTS

JP 2015-011426 A 1/2015

OTHER PUBLICATIONS

Johansson, et al., "Extracting Opinion Expressions and Their Polarities—Exploration of Pipelines and Joint Models," Proceedings of the 49th Annual Meeting of the Association for Computational Linguistics, 2011. (Year: 2011).*

(Continued)

*Primary Examiner* — Feng-Tzer Tzeng
(74) *Attorney, Agent, or Firm* — Oblon, McClelland, Maier & Neustadt, L.L.P.

(57) ABSTRACT

An information processing device includes a processing unit configured to receive as input a document and a question, and to execute processing to output an answer range as a range of a string that can be an answer to the question in the document, or an answer suitability of the document with respect to the question, by using neural networks, wherein the processing unit includes a first neural network configured to calculate the answer range, and a second neural network configured to calculate the answer suitability, and (Continued)

between the first neural network and the second neural network, part of layers constituting both neural networks is shared.

13 Claims, 20 Drawing Sheets

(51) Int. Cl.
*G06F 16/93* (2019.01)
*G06F 40/279* (2020.01)
*G06N 3/08* (2006.01)

(56) References Cited

OTHER PUBLICATIONS

Seo, M. et al., "Bi-Directional Attention Flow for Machine Comprehension," ICLR, Feb. 24, 2017, pp. 1-13.
Chen, D. et al., "Reading Wikipedia to Answer Open-Domain Questions," in ACL (1), Apr. 28, 2017, total pp. 10.
Mikolov, T. "Distributed Representations of Words and Phrases and their Compositionality," in Proceedings of NIPS, Oct. 16, 2013, pp. 1-9.
Hochreiter, S. et al., "Long Short-Term Memory," Neural Computation, vol. 9, No. 8, 1997, pp. 1-32.
Rajpurkar, P. et al., "SQuAD: 100,000+ Questions for Machine Comprehension of Text," in EMNLP, Association for Computational Linguistics, Nov. 1-5, 2016, pp. 2383-2392.
Craswell, N. "Success at n," in Encyclopedia of Database Systems, Dec. 7, 2018, total pp. 2.
Craswell, N. "Mean Reciprocal Rank," in Encyclopedia of Database Systems, Dec. 7, 2018, total pp. 2.
Robertson, S. E., "Some Simple Effective Approximations to the 2-Poisson Model for Probabilistic Weighted Retrieval," in SIGIR, 1994, total pp. 11.
Pakray, P. et al., "A Hybrid Question Answering System based on Information Retrieval and Answer Validation", CLEF 2011 Labs and Workshop, Notebook Papers, 2011. Internet: URL: <https://www.researchgate.net/publication/221159977_A_Hybrid_Question_Answering_System_based_on_Information_Retrieval_and_Answer_Validation>, total pp. 17.
Yu, Y., "End-to-End Answer Chunk Extraction and Ranking for Reading Comprehension", Association for the Advancement of Artificial Intelligence, Nov. 2, 2016, Internet URL: < https://arxiv.org/abs/1610.09996>, total pp. 8.
Nishida, K. et al., "Retrieve-and-Read: Multi-task Learning of Information Retrieval and Reading Comprehension", arXiv preprint, Aug. 31, 2018, Internet: URL: <https://arxiv.org/abs/1808.10628>, total pp. 11.
International Search Report dated Dec. 25, 2018 in PCT/JP2018/037482 filed on Oct. 5, 2018, 2 pages.

\* cited by examiner

FIG.7

| Word | Vector (300 dimensions) |
|---|---|
| go | [0.2, 0.14, −0.50, ⋯, 0.98] |
| write | [−0.3, 0.5, −0.23, ⋯, 0.82] |
| baseball | [0.15, 0.23, −0.32, ⋯, 0.9] |
| ⋮ | ⋮ |
| apple | [0.82, 0.23, 0.39, ⋯, −0.51] |

FIG.13

| Word | Vector (300 dimensions) |
|---|---|
| go | [0.2, 0.14, −0.50, ···, 0.98] |
| write | [−0.3, 0.5, −0.23, ···, 0.82] |
| baseball | [0.15, 0.23, −0.32, ···, 0.9] |
| ⋮ | ⋮ |
| apple | [0.82, 0.23, 0.39, ···, −0.51] |

FIG.15

| Model | | Success@1 | MRR@5 |
|---|---|---|---|
| BM25 | | 0.743 | 0.806 |
| Our IR | STL | 0.707±0.003 | 0.773±0.003 |
| | MTL | 0.811±0.002 | 0.863±0.002 |

FIG.16

| Model | | EM |
|---|---|---|
| BiDAF | | 67.7 |
| Our RC | STL | 69.090±0.100 |
| | MTL | 69.317±0.111 |

FIG.17

| Single Model | EM |
| --- | --- |
| BM25 + Our RC(STL) | 53.922±0.170 |
| E2E-QA | 59.974±0.207 |

| Ensemble Model | EM |
| --- | --- |
| BM25 + Our RC(STL) | 56.575 |
| E2E-QA | 64.475 |

INFORMATION PROCESSING DEVICE, INFORMATION PROCESSING METHOD, AND PROGRAM

TECHNICAL FIELD

The present invention relates to a technique for extracting an answer to a question from a document.

BACKGROUND ART

For a given document, if "reading comprehension" that extracts an answer range for a question can be precisely performed by artificial intelligence, it can be applied to a wide variety of services such as question answering and intelligent agent dialogue.

As a conventional technique for performing reading comprehension, for example, there have been techniques disclosed as in Non-Patent Document 1 and the like.

RELATED ART DOCUMENTS

Non-Patent Documents

[Non-Patent Document 1] Seo, M.; Kembhavi, A.; Farhadi, A.; and Hajishirzi, H. 2017. Bidirectional attention flow for machine comprehension. In ICLR.
[Non-Patent Document 2] Chen, D.; Fisch, A.; Weston, J.; and Bordes, A. 2017. Reading Wikipedia to answer open-domain questions. In ACL (1), 1870-1879.

SUMMARY OF INVENTION

Problem to be Solved by the Invention

In the conventional techniques disclosed in Non-Patent Document 1 and the like, word sequence of a document and a question are encoded (vectorized) and matched with the vector expressions of the word sequence, and then, the position numbers of the start and end of the answer range in the document are output.

However, in the conventional techniques related to reading comprehension, when only a question is given, it is not possible to search for a document that can answer the question from among a large number of documents, and to output an answer range in a document as the search result (question answering). In order to perform question answering, as described in Non-Patent Document 2, it is necessary to couple a device that performs information search with a device that performs reading comprehension. However, in the conventional technique as described in Non-Patent Document 2, a device that performs information search is simply coupled with a device that performs reading comprehension, and there has been a problem that high precision of information search cannot be obtained by such simple coupling. This is because a normal information search device can search for a document corresponding to a word included in a series of words in a question, but cannot determine whether the document includes information on an answer to the question.

The present invention has been made in view of the above points, and has an object to provide a technique that enables to search for a document that is answerable to a question from among a group of documents, and to output an answer range in the document as the search result with higher precision than the conventional techniques.

Means for Solving the Problem

According to the disclosed techniques, an information processing device is provided that includes a processing unit configured to receive as input a document and a question, and to execute processing to output an answer range as a range of a string that can be an answer to the question in the document, or an answer suitability of the document with respect to the question, by using neural networks, wherein the processing unit includes a first neural network configured to calculate the answer range, and a second neural network configured to calculate the answer suitability, and between the first neural network and the second neural network, part of layers constituting both neural networks is shared.

Advantage of the Invention

According to the disclosed techniques, a technique is provided that enables to search for a document that is answerable to a question from among a group of documents and to output an answer range in the document as the search result with higher precision than the conventional techniques. In other words, an effect is obtained such that after having narrowed down an answerable document to a question from among a large number of documents, an answer range can be extracted from the document with a higher precision than ever.

BRIEF DESCRIPTION OF DRAWINGS

FIG. 7 is a diagram illustrating an example of data stored in a word vector storage unit 101;
FIG. 13 is a diagram illustrating an example of data stored in a word vector storage unit 111;

FIG. 15 is a diagram illustrating experimental results;

FIG. 16 is a diagram illustrating experimental results; and

FIG. 17 is a diagram illustrating experimental results.

EMBODIMENTS OF THE INVENTION

In the following, a first embodiment and a second embodiment according to the present invention will be described with reference to the drawings. Note that the first and second embodiments described below are merely examples, and embodiments to which the present invention can be applied are not limited to the first and second embodiments as follows. For example, although techniques related to the first and second embodiments can be used for question answering related to a specialized document corpus and the like, the application field is not limited as such and can be used in various fields. Note that the question answering device in the first and second embodiments may be referred to as an information processing device.

First, the first embodiment will be described.

Overview of the First Embodiment

In the first embodiment, a question answering device extracts a range of an answer part with respect to an input question from among a word sequence of a document given as input, and simultaneously, outputs an answer suitability indicating a degree of the document as being answerable to the question. The question answering device related to the first embodiment simultaneously performs learning of a reading comprehension task to extract a range of an answer part from the document, and a search task to determine whether the document includes answerable information with respect to the question, so as to be capable of improving the precision of reading comprehension, search, and question answering.

More specifically, the question answering device implements the reading comprehension, search, and question answering described above by using neural networks, in which a neural network that performs information search and a neural network that performs reading comprehension share part of the intermediate layers, and thereby, to be capable of performing learning simultaneously on the information search and reading comprehension, and improving the precision of both tasks and question answering.

(Device Configuration and Overview of Operations)

Figure 1:
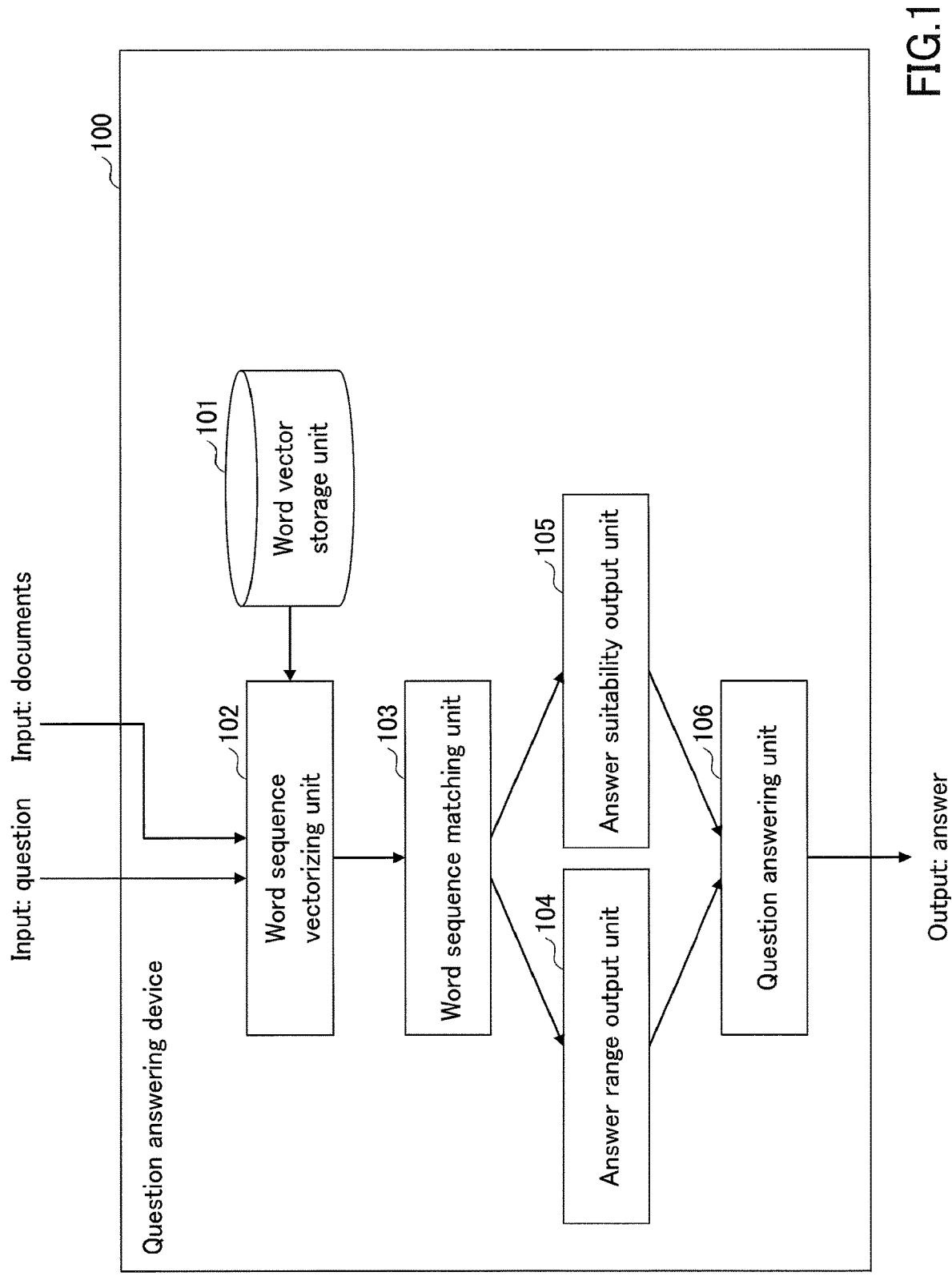
FIG. 1 is a configuration diagram of a question answering device 100 in a first embodiment according to the present invention.

FIG. 1 illustrates a configuration of a question answering device 100 in the first embodiment according to the present invention. The configuration illustrated in FIG. 1 is a configuration during a process of question answering. As illustrated in FIG. 1, the question answering device 100 includes a word vector storage unit 101, a word sequence vectorizing unit 102, a word sequence matching unit 103, an answer range output unit 104, an answer suitability output unit 105, and a question answering unit 106.

Figure 2:
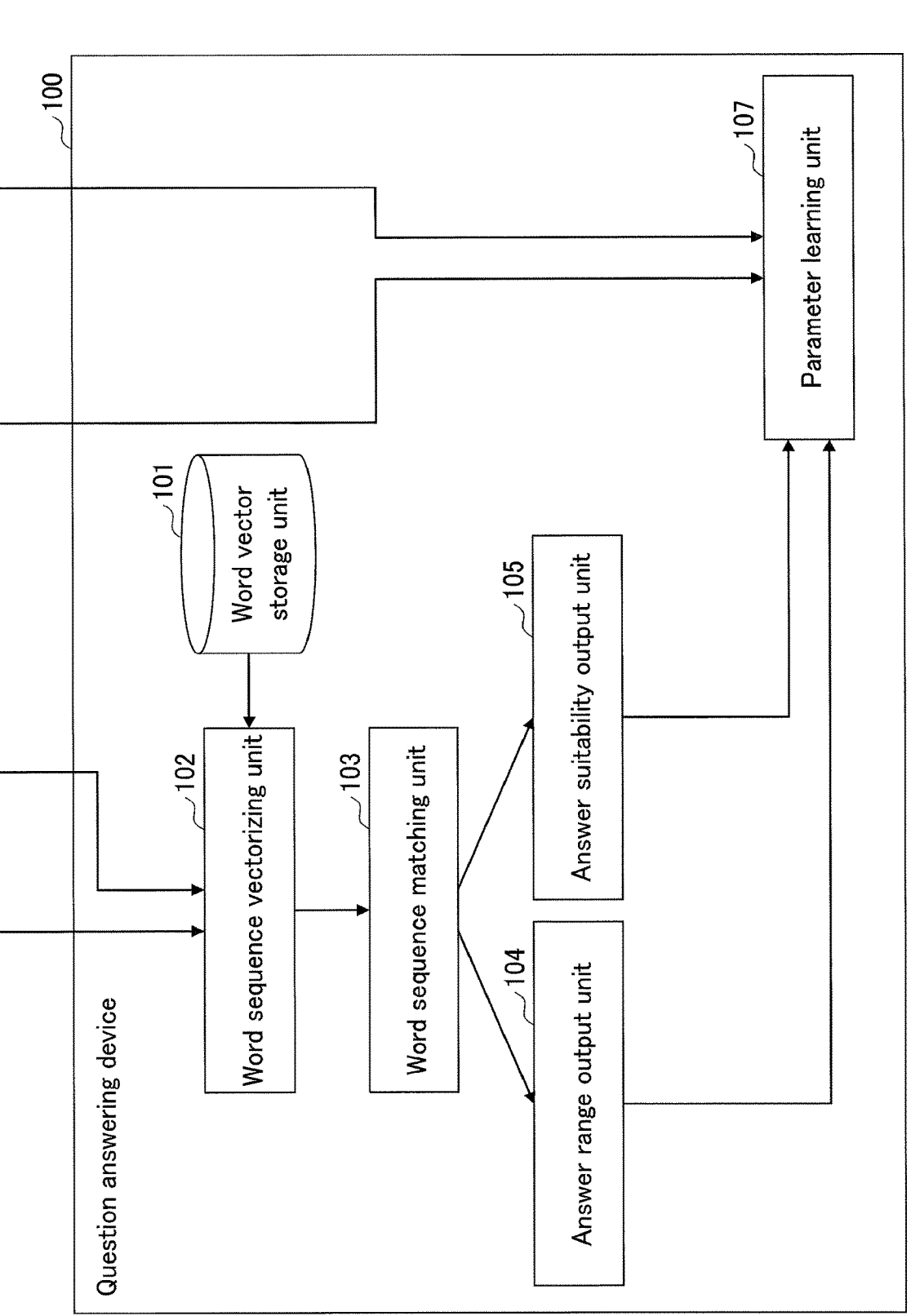
FIG. 2 is a configuration diagram of the question answering device 100 during learning in the first embodiment according to the present invention.

FIG. 2 illustrates a configuration of the question answering device 100 during learning. The question answering device 100 during the learning differs from the configuration of the question answering device 100 in FIG. 1, in that the question answering unit 106 is not provided, and instead, a parameter learning unit 107 is provided. The other elements are the same between the configuration during the process of question answering and the configuration during the learning.

A configuration obtained by adding the parameter learning unit 107 to the configuration in FIG. 1 may be adopted as the configuration of the question answering device 100. In this case, FIG. 1 illustrates a configuration used during the process of question answering, and FIG. 2 illustrates a configuration used during the learning. In the following, the "question answering device 100" will be described, assuming a configuration obtained by adding the parameter learning unit 107 to the configuration in FIG. 1. Note that the question answering unit 106 may exist outside the question answering device 100. Details of operations of each unit will be described later.

Each functional unit of the question answering device 100 (specifically, each layer of the neural networks) performs learning in advance by using a training data set constituted with multiple tuples of (question, document, answer range, and answer suitability). Here, "learning" means appropriately determining parameters (weights and the like) in a neural network so as to output target information with respect to input.

Then, with respect to a question and a set of documents (here, referred to as test data) to be input, each pair of the question and a document included in the set of documents is input into the learned question answering device 100, to output an answer extracted from a document having a high answer suitability. Data with respect to the answer range and answer suitability that serves as the right answer is given only during the learning, and not given during the testing (during outputting an answer to an input question). Note that the answer range is a part corresponding to an answer to the question in a document, which is represented by the position numbers of words between the start and end of the answer range in the document.

Figure 3:
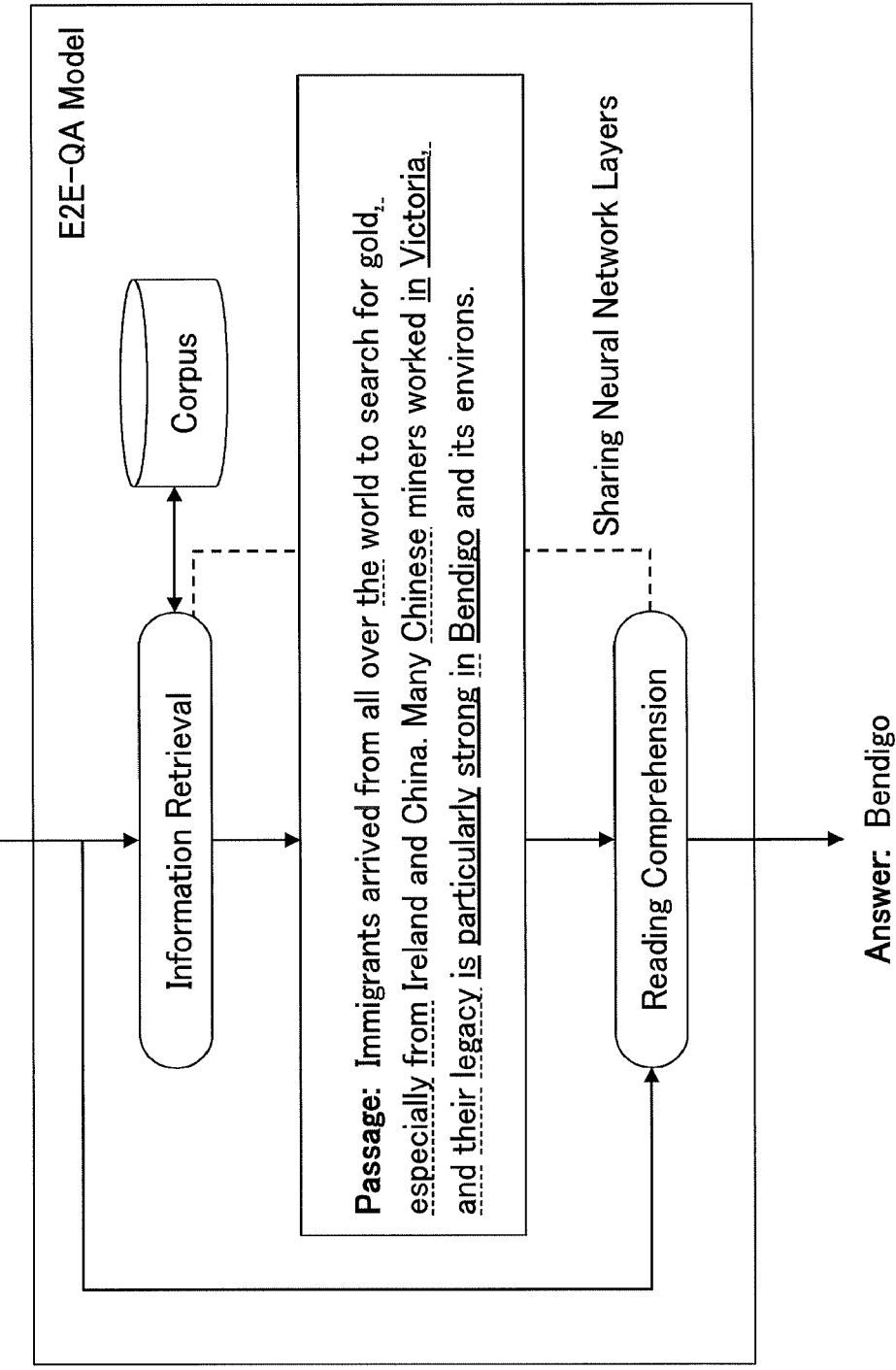
FIG. 3 is a diagram for illustrating a summary of operations.

An image in the case of the question answering device 100 outputting an answer to an input question is illustrated in FIG. 3. As illustrated in FIG. 3, a question is input in a form of a sentence, and the question answering device 100 simultaneously performs processing of information search and reading comprehension to be modeled collectively by using the neural networks, so as to perform learning at once by using only the input/output information. Such processing is what is called end-to-end processing. As illustrated in FIG. 3, the question answering device 100 searches for a document (passage) from among a group of documents (corpus), focusing not only on words included in the question, but also on whether or not information related to an answer is included, so as to extract an answer from these. As illustrated in FIG. 3, the layers of the neural networks are shared by the information search and the reading comprehension. Note that a document is a set of sentences.

In the training data set as input into the question answering device 100 during the learning illustrated in FIG. 2, a document including an answer to the question is set as a right-answer document. There may be multiple right-answer documents for a question. It is assumed that there may be one or more answer ranges in each right-answer document. The answer suitability is set to, for example, 1 for a right-answer document, and 0 otherwise. Note that the answer suitability of a document to which an answer range has been given may be set to 1 automatically.

In the question answering device 100, a functional unit that calculates an answer range and an answer suitability from among a document and a question is implemented by neural networks. A neural network is a mathematical model, and the functional unit in the question answering device 100 is implemented by software (and a processor such as a CPU or GPU) that performs operations on a mathematical model corresponding to the neural networks.

Figure 4:
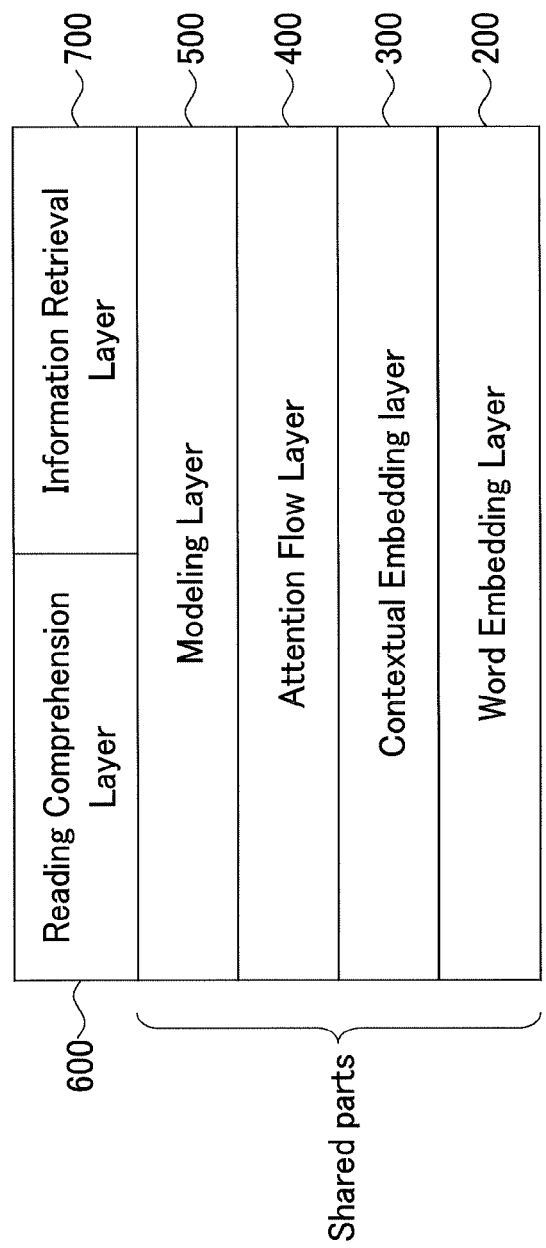
FIG. 4 is a diagram illustrating a configuration of a model.

FIG. 4 illustrates an example of a configuration of neural networks used by the question answering device 100. Although the configuration is based on a configuration disclosed in Non-Patent Document 1, in the first embodiment, part of the layers in the neural networks is shared between information search and reading comprehension, and in this regard, no disclosure is found in Non-Patent Document 1.

As illustrated in FIG. 4, the neural networks constituting the question answering device 100 includes a word embedding layer 200, a contextual embedding layer 300, an attention flow layer 400, a modeling layer 500, a reading comprehension layer 600, and an information retrieval layer 700.

The word embedding layer 200 and the contextual embedding layer 300 correspond to the word sequence vectorizing unit 102. The attention flow layer 400 and the modeling layer 500 correspond to the word sequence matching unit 103. The reading comprehension layer 600 includes a layer related to reading comprehension, and corresponds to the answer range output unit 104. The information retrieval layer 700 includes a layer related to information search, and corresponds to the answer suitability output unit 104.

As illustrated in FIG. 4, the word embedding layer 200, the contextual embedding layer 300, the attention flow layer 400, and the modeling layer 500 are shared between information search and reading comprehension.

The processing performed by the question answering device 100 is summarized as follows. Details of H, U, and M in the following description will be described later in the detailed description.

First, the word sequence vectorizing unit 102 converts a document and a question sentence, which have been input, into a vector series H and a vector series U, respectively. Next, the word sequence matching unit 103 calculates a matching matrix M, based on the vector series H of the document and the vector series U of the question. The answer range output unit 104 calculates an answer range based on the matching matrix M. The answer suitability output unit 105 outputs an answer suitability based on the matching matrix M. The question answering unit 106 performs answer-determination processing and the like, as will be described later.

During the learning, the parameter learning unit 107 performs processing based on a training data set (constituted with multiple tuples of (question, document, answer range, and answer suitability)), to perform a loss calculation by using the input answer range (as a right answer) and answer suitability, and the output answer range and answer suitability, so as to update the parameters of the neural networks.

Note that as the training data set, instead of giving an answer range as a right answer to the question, it is possible to give an answer string as a right answer to the question, and to use a range in which the answer string as the right answer is included by exact match in the document, or a range in which the greatest number of overlaps is included by partial match, instead of the answer range of the right answer, so as to perform learning. However, giving an answer range as a right answer enables to provide a more accurate answer; therefore, it is desirable to give an answer range as a right answer.

(Example of Hardware Configuration)

The question answering device 100 described above can be implemented by, for example, causing a computer to execute a program describing the processing contents described in the first embodiment. In other words, the question answering device 100 can be implemented by executing a program corresponding to the processing performed on the question answering device 100 using hardware resources such as a CPU and a memory that are built in the computer. The above program may be recorded on a computer-readable recording medium (a portable memory etc.) so as to be saved or distributed. Also, the above program may be provided through a network such as the Internet and by using e-mail.

Figure 5:
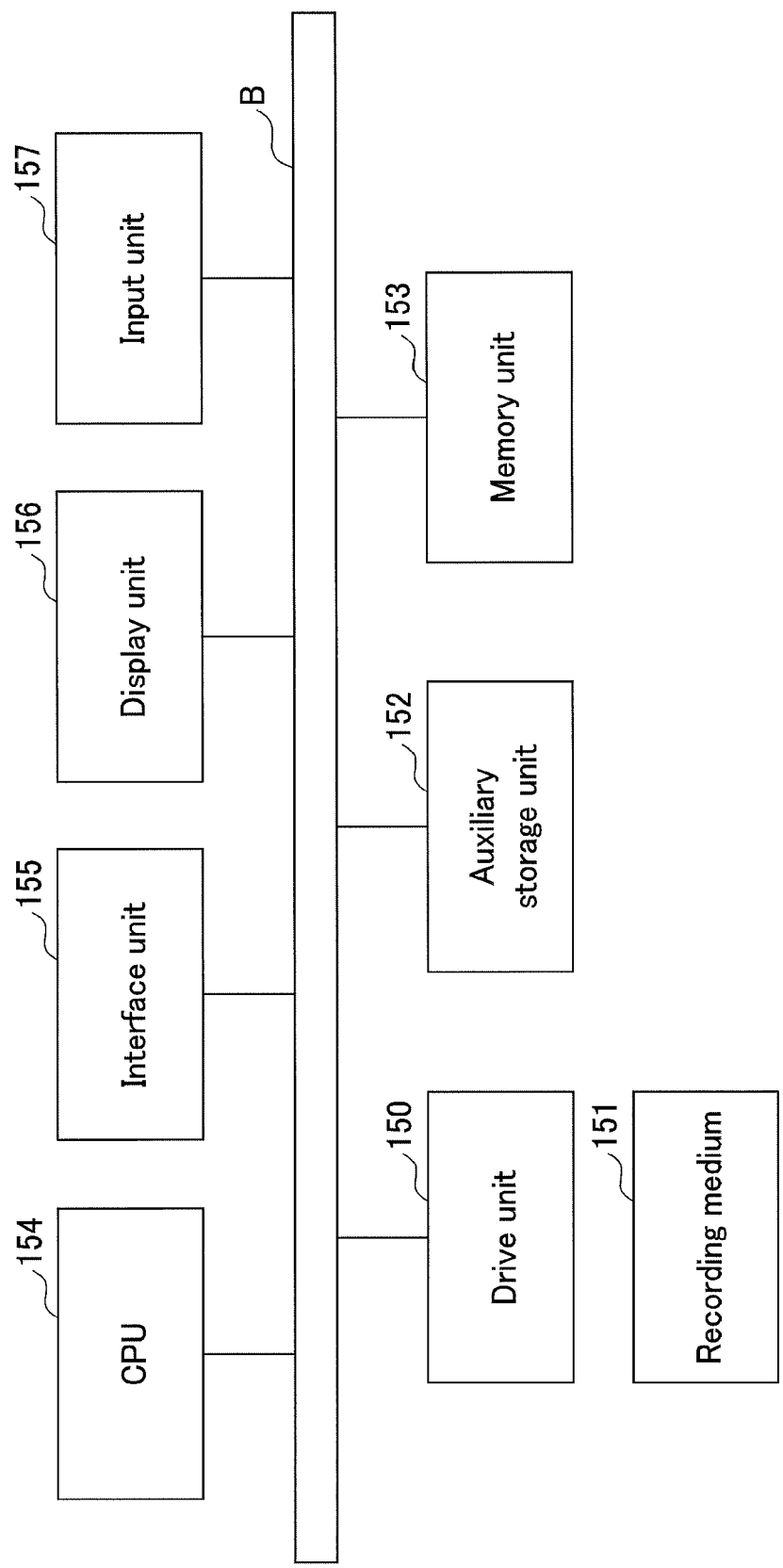
FIG. 5 is a diagram illustrating an example of a hardware configuration of the question answering device 100.

FIG. 5 is a diagram illustrating an example of a hardware configuration of the computer in the present embodiment. The computer in FIG. 5 includes a drive unit 150, an auxiliary storage unit 152, a memory unit 153, a CPU 154, an interface unit 155, a display unit 156, an input unit 157, and the like, which are interconnected via a bus B.

The program that implements the processing on the question answering device 100 is provided with, for example, a recording medium 151 such as a CD-ROM or a memory card. Once the recording medium 151 storing the program is set in the drive unit 150, the program is installed into the auxiliary storage unit 152 from the recording medium 151 via the drive unit 150. However, installation of the program is not necessarily executed from the recording medium 151, and may also be downloaded from another computer via the network. The auxiliary storage unit 152 stores the installed program, and stores required files, data, and the like as well.

Upon receiving a command to activate the program, the memory unit 153 reads out the program from the auxiliary storage unit 152, to load the program. The CPU 154 implements functions related to the device according to the program stored in the memory unit 153. The interface unit 155 is used as an interface for connecting to a network. The display 156 displays a GUI (Graphical User Interface) and the like by the program. The input unit 157 is constituted with a keyboard, a mouse, buttons, a touch panel, and the like, which are used for inputting various operation commands.

(Detailed Processing Contents)

In the following, a specific detailed example of the processing executed by the question answering device 100 in the first embodiment will be described.

<Processing During Learning>

Figure 6A:
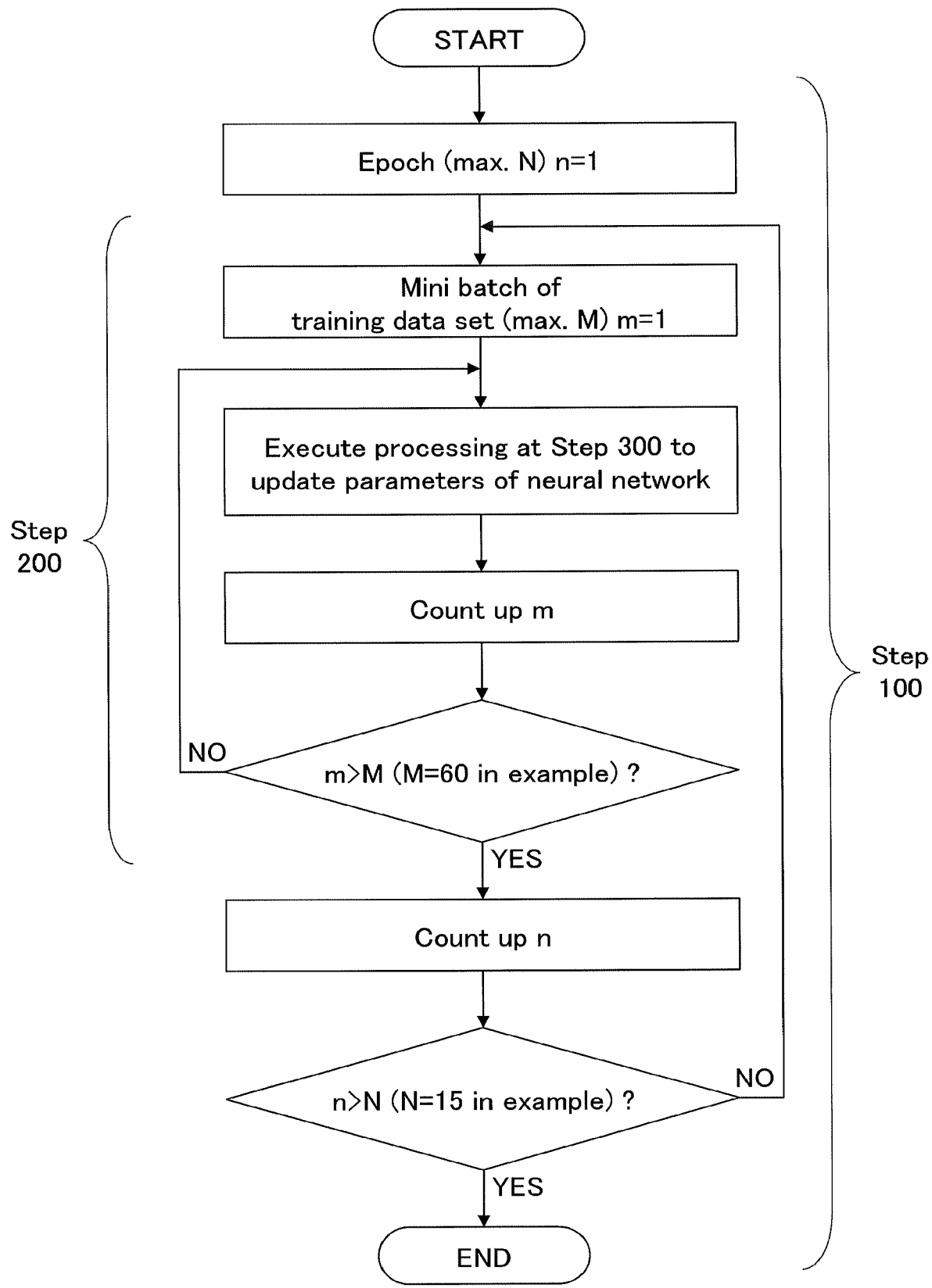
FIG. 6A is a flow chart illustrating processing steps of the question answering device 100 during learning.

FIG. 6A is a flow chart illustrating processing steps of the question answering device 100 during the learning in the first embodiment. An example of processing steps executed by the question answering device 100 during learning will be described along steps in FIG. 6A. Here, as an example, the unit of learning is referred to as an epoch. Note that M in the flow chart represents the maximum number of mini-batches; m represents the count value of mini-batches; N represents the maximum number of epochs; and n represents the count value of epochs. M, m, N, and n in the flow chart are unrelated to the parameters in the neural networks.

Step 100) The question answering device 100 repeats processing at Step 200 for the number of epochs denoted as N. In the present embodiment, N=15. As illustrated in FIG. 6A, starting from an epoch count value n=1, n is counted up each time the processing at Step 200 is completed for one epoch, and the flow ends when n>N.

Step 200) The question answering device 100 partitions the training data set into data items of mini-batches up to the maximum of M mini-batches, and repeats processing at Step 300 for each mini-batch. In the present embodiment, M=60. As illustrated in FIG. 6A, starting from a mini-batch count value m=1, m is counted up each time the processing at Step 300 is completed for one mini-batch, and when m>M, the processing transitions to the next epoch. Note that partitioning into mini-batches is an example, and it is possible to perform the processing without partitioning into mini-batches.

Step 300) Steps 310 to 360 as follows are performed for each data item constituting a mini-batch (M times for all).

Figure 6B:
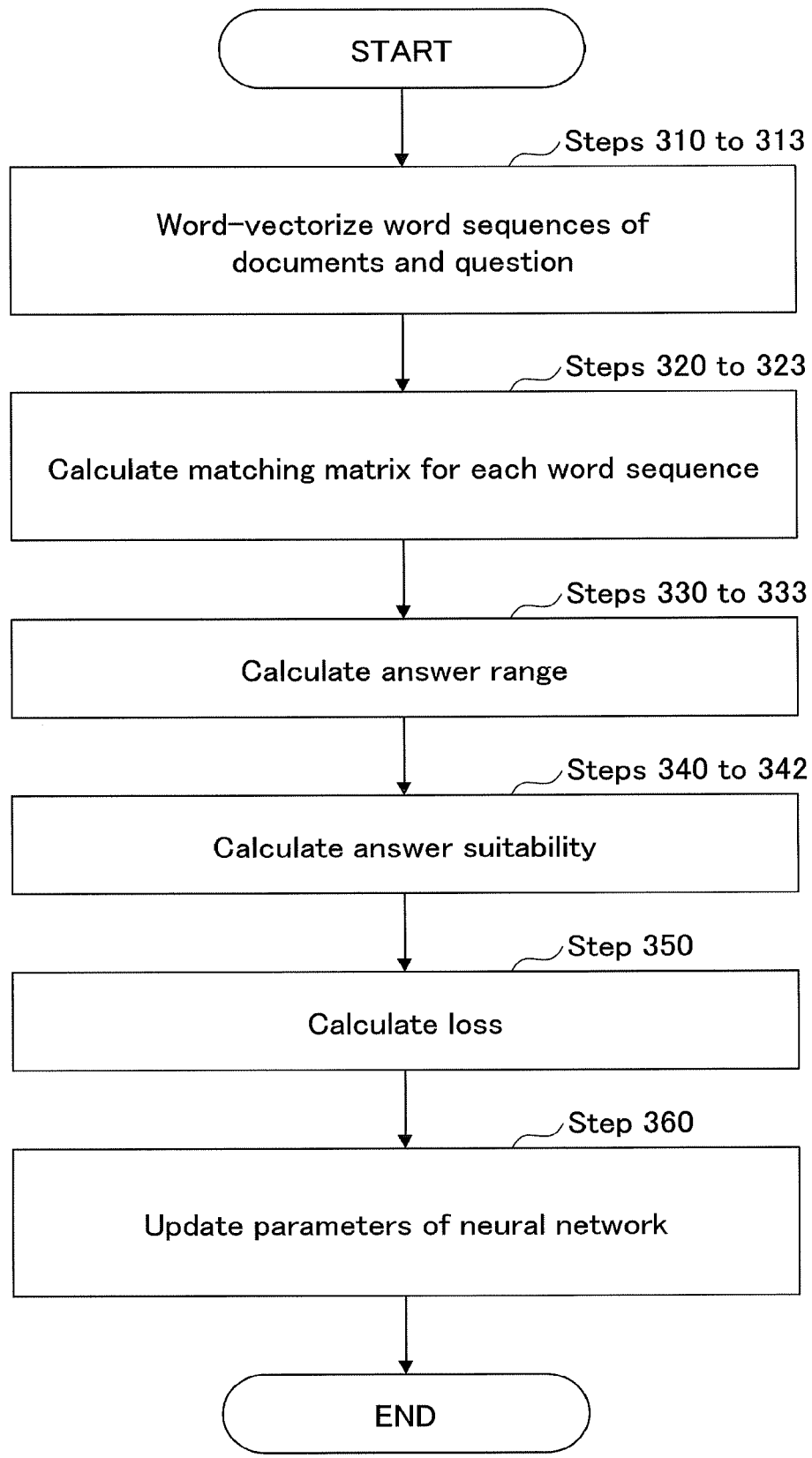
FIG. 6B is a flow chart illustrating processing steps at Step 300.

In the following, the contents of the processing to be performed at Step 300 described above will be described along steps illustrated in a flow chart in FIG. 6B. Note that a number starting from 1 assigned to each word in an input document from the beginning to the end of the document will be referred to as a position number.

Step 310) The word sequence vectorizing unit 102 searches in the word vector storage unit 101 for each word included in a word sequence $(x_1, x_2, \ldots, x_T)$ of the first to T-th words of the document, and converts the word sequence into a vector series of word vectors $e_t$ each corresponding to the t-th word $x_t$ as expressed as follows.

$$X = [e_1 \ e_2 \ \ldots \ e_T] \in R^{E \times T} \quad \text{(Formula 1)}$$

where T is the number of words set discretionarily. Note that if an input word sequence has a length of less than T, a special word "PAD" is inserted at the end. If a word sequence exceeds T, the exceeding part of the word sequence is ignored. In the present embodiment, T=400 and E=300.

FIG. 7 illustrates an example of data stored in the word vector storage unit 101. In the word vector storage unit 101, pairs of (word, word vector) generated by a method as described in Reference 1 or the like are stored, and the dimensionality of the word vector is E. Note that titles of references are listed at the end of the Description. In the case of a word not included in the word vector storage unit 101 and the special word "PAD", the word vector is assumed to be an E-dimensional zero vector. Note that a word vector as stored in the word vector storage unit 101 may be included as a learnable parameter of a neural network.

Step 311) The word sequence vectorizing unit 102 converts a vector series X of the document into a vector series H having a size of 2d×T, by a bidirectional LSTM (hidden state size d) shown in Reference 2. In the present embodiment, d=100.

Step 312) The word sequence vectorizing unit 102 searches in the word vector storage unit 101 for each word included in a word sequence of the question $(q_1, q_2, \ldots, q_J)$ of the first to j-th words of the question sentence, and converts the word sequence into a vector series of word vectors $e_1$ each corresponding to the j-th word $q_j$ as expressed as follows.

$$Q = [e_1 \ e_2 \ \ldots \ e_J] \in R^{E \times J} \quad \text{(Formula 2)}$$

where J is the number of words set discretionarily. If an input word sequence has a length of less than J, a special word "PAD" is inserted at the end. If a word sequence exceeds J, the exceeding part of the word sequence is ignored. In the present embodiment, J=30.

Step 313) The word sequence vectorizing unit 102 converts a vector series Q of the question into a vector series U having a size of 2d×J, by a bidirectional LSTM (hidden state size d) shown in Reference 2.

Step 320) The word sequence matching unit 103 calculates a matching matrix S based on the vector series H of the document and the vector series U of the question. Each element $S_{tj}$ of the matrix S is obtained as follows, by using a vector $H_t$ of the t-th word $x_t$ of the document and a vector $U_j$ of the j-th word $q_j$ of the question sentence. The matching matrix S represents a semantic matching result between the document and the question.

$$S_{tj} = w_S^t [H_t; U_j; H_t \circ U_j] \in R \quad \text{(Formula 3)}$$

In the above formula, ∘ denotes the element-wise product of vectors, and ';' denotes concatenation of vectors.

$$w_S \in R^{6d} \quad \text{(Formula 4)}$$

is a model parameter to be learned. Note that as for t used in the present Description, a superscript t denotes transposition, and a subscript t denotes the position number of a word.

Step 321) The word sequence matching unit 103 calculates an attention-weighted mean vector "$\tilde{U}_t$" based on the matching matrix S. Note that for the sake of convenience for describing in the Description, in the text of the Description, "X having a wavy line on the top" is expressed as X˜. "$\tilde{U}_t$" is calculated by the following formula.

$$\tilde{U}_t = \sum_{j=1}^{J} a_{tj} U_j \in R^T \quad \text{(Formula 5)}$$

In the above formula, $a_t = \text{softmax}_j(S_t) \in R^J$ where $S_t$ is a vector at the t-th row of S; and softmax is an example of an activation function.

Step 322) The word sequence matching unit 103 calculates a vector series G by the following formula.

$$G = [H; \tilde{U}; H \circ \tilde{U}] R^{6d \times T} \quad \text{(Formula 6)}$$

Step 323) The word sequence matching unit 103 converts the vector series G into a matching matrix $M \in R^{2d \times T}$ by a single-layer bidirectional LSTM (hidden state size d). Each column of the matching matrix M now represents a meaning of each word $x_t$ depending on the question.

Step 330) The answer range output unit 104 converts the matching matrix M into $M^1 \in R^{2d \times T}$ by a single-layer bidirectional LSTM (hidden state size d). $M^1$ is a matching matrix for calculating the start of an answer.

Step 331) The answer range output unit 104 outputs a probability distribution $p^1$ with respect to the start of the answer.

$$p^1 = \text{softmax}(w_{p1}{}^t M^1) \in R^T \quad \text{(Formula 7)}$$

$$w_{p1} \in R^{2d} \quad \text{(Formula 8)}$$

is a learnable parameter.

Step 332) The answer range output unit 104 converts $M^1$ into $M^2 \in R^{2d \times T}$ by a single-layer bidirectional LSTM (hidden state size d). $M^2$ is a matching matrix for calculating the end of an answer. In order to calculate the end considering the start, $M^2$ is generated based on $M^1$ instead of M.

Step 333) The answer range output unit 104 outputs a probability distribution $p^2$ with respect to the end of the answer.

$$p^2 = \mathrm{softmax}(w_{p^2}{}^t M^2) \in R^T \quad \text{(Formula 9)}$$

$$w_{p^2} \in R^{2d} \quad \text{(Formula 10)}$$

is a learnable parameter.

Step 340) The answer suitability output unit 105 converts the matching matrix M into $M^r \in R^{2d \times T}$ by a single-layer bidirectional LSTM (hidden state size d).

Step 341) The answer suitability output unit 105 calculates a weighted mean vector $\tilde{m}$ by the following formula.

$$\tilde{m} = \sum_{t=1}^{T} \beta_t M_t^r \in R^{2d} \quad \text{(Formula 11)}$$

where the weight $\beta$ is calculated as follows.

$$m_t = W_a M_t^r + b_a \quad \text{(Formula 12)}$$

$$\beta = \frac{\exp(m_t \cdot w_c)}{\sum_{t=1}^{T} \exp(m_t \cdot w_c)} \quad \text{(Formula 13)}$$

In the above, $W_a \in R^{c \times 2d}$, $b_a \in R^c$, and $w_c \in R^c$ are learnable parameters; and c is the size of an attention vector. In the present embodiment, c=75.

Adopting such a configuration enables to perform weighting to clarify which words in a document are more important for answering a question, instead of treating all words in the document equally; therefore, the search precision can be improved.

Step 342) The answer suitability output unit 105 calculates an answer suitability by the following formula.

$$p^r = \mathrm{sigmoid}(w_{p^r}{}^t \tilde{m}) \in [0, 1] \quad \text{(Formula 14)}$$

$$w_{p^r} \in R^{2d} \quad \text{(Formula 15)}$$

is a learnable parameter; and sigmoid is an example of an activation function.

Step 350) The parameter learning unit 107 uses the answer suitability of a right answer $z \in \{0, 1\}$ (1 indicates an answerable document for the question, 0 indicates otherwise); the answer range of the right answer (integers satisfying $1 \leq y^1$, $y^2 \leq T$); the answer suitability of an output $p^r$; the answer range of the output ($p^1$, $p^2$); and a constant $\lambda$, to calculate the loss as follows:

$$L = -z \log p^r - (1-z)\log(1-p^r) - \lambda z (\log p_{y^1}^1 + \log p_{y^2}^2) \quad \text{(Formula 16)}$$

In the present embodiment, $\lambda = 1$. Here, $$p_{y^1}^1 \quad \text{(Formula 17)}$$

is the value of a position number $y^1$ in the probability distribution $p^1$.

$$p_{y^2}^2 \quad \text{(Formula 18)}$$

is the value of a position number $y^2$ in the probability distribution $p^2$.

Step 360) The parameter learning unit 107 averages the loss L for data items calculated at Step 350 with respect to the mini-batch, and optimizes learnable parameters of all the neural networks by a stochastic gradient descent method, to update the parameters. Note that the present invention does not depend on the optimization method, and other optimization methods may be used.

The processing at Step 340 described above may be replaced with processing at Step 340' described below.

Step 340') The answer suitability output unit 105 calculates an exact matching matrix $B \in R^{J \times T}$ in which an element at the j-th row and the t-th column is set to 1 if the j-th word in the question exactly matches the t-th word in the document, or set to 0 otherwise. Next, the maximum value is taken for each column of B, to obtain $b = \max_j(B) \in R^{1 \times T}$. Each element of b (vector of a length T) takes 1 if the word in the document corresponding to the element is present in the question, or 0 if not.

$[M;b] \in R^{(J+1) \times T}$ obtained by concatenating the matching matrix M with b is converted into $M^r \in R^{2d \times T}$ by a single-layer bidirectional LSTM (hidden state size d). In the case of performing the processing at Step 340', $M^r$ obtained from [M;b] in this way is used as $M^r$ at Steps 341 to 342.

Taking the exact match into consideration as in Step 340' enables to emphasize that words in the question are included in the document, and hence, to make it easier to take the intention of the question into account. Therefore, the search precision can be improved.

<Processing Contents During Testing (when Outputting an Answer for a Question)>

Figure 8A:
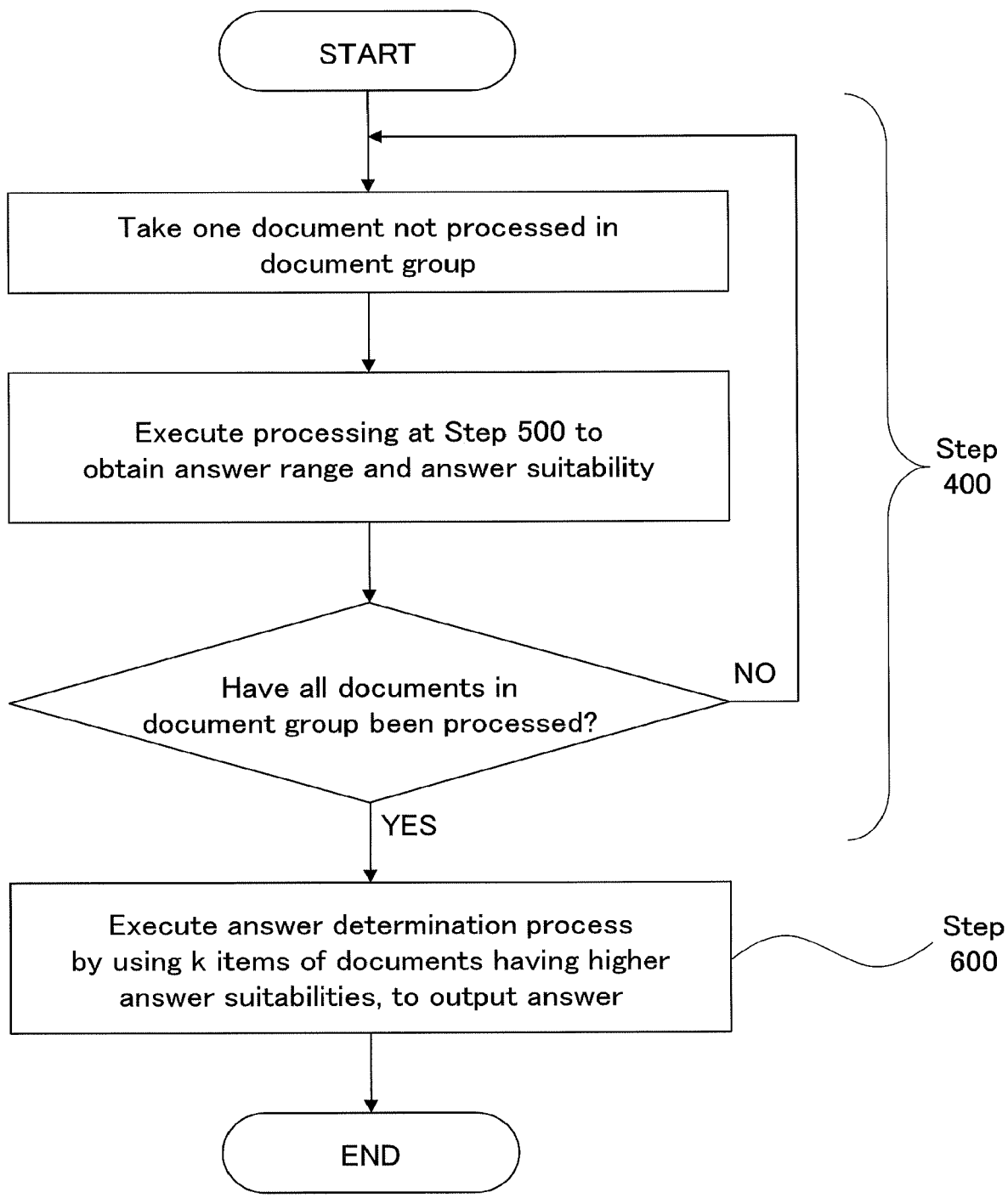
FIG. 8A is a flow chart illustrating processing steps of the question answering device 100 during question answering.

FIG. 8A is a flow chart illustrating processing contents when testing the question answering device 100 in the present embodiment. In the present embodiment, during the testing, the question answering device 100 receives as input a group of documents (a corpus to be searched) and a word sequence of a question, and outputs an answer extracted from a document. Note that the group of documents is constituted with one or more documents. In the following, the processing contents of the question answering device 100 during the testing will be described along steps illustrated in FIG. 8A.

Step 400) The question answering device 100 repeats Step 500 for each document included in the document corpus to be searched. In other words, as illustrated in FIG. 8A, processing at Step 500 is executed for each document until the processing at Step 500 is completed for all documents in the group of documents, to obtain answer ranges and answer suitabilities.

Figure 8B:
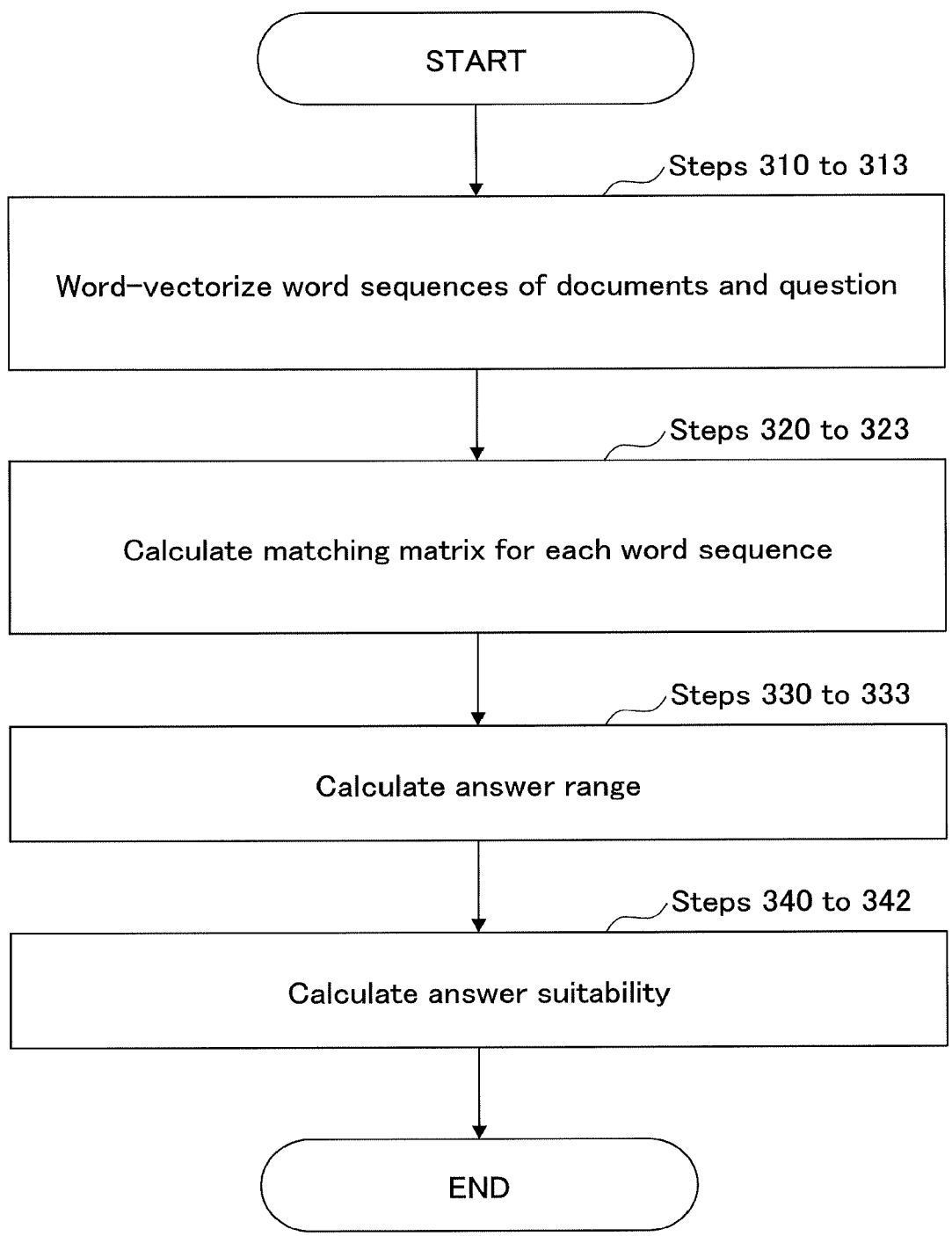
FIG. 8B is a flow chart illustrating processing steps at Step 500.

Step 500) As illustrated in FIG. 8B, the question answering device 100 performs processing similar to Steps 310 to 340 of the flow chart during the learning for each document and the word sequence of the question, to output the answer suitability $p^r$ and the answer range ($p^1$, $p^2$). As for Step 340, the processing at Step 340' described above may be performed instead of Step 340.

Step 600) The question answering unit 106 selects k items of documents having the highest answer suitability where k is an integer greater than or equal to 1. The question answering unit 106 obtains, for each of the selected documents, in the answer range ($p^1$, $p^2$), the position numbers ($t_1$, $t_2$) that give a highest value of the following formula by dynamic programming, and extracts a string corresponding to the range of ($t_1$, $t_2$) of the word sequence of the document as an answer candidate.

$$p^1_{t_1} p^2_{t_2} \qquad \text{(Formula 19)}$$

A value expressed in Formula 19 indicates a probability of the answer candidate as an answer, and hence, this value may be referred to as the "probability". Also, this value may be referred to as "likelihood", "certainty factor", or the like.

$$p^1_{t_1} p^2_{t_2} \qquad \text{(Formula 20)}$$

When obtaining ($t_1$, $t_2$) that give a highest value of the above formula, the question answering unit 106 may use a method other than dynamic programming as long as the order of the start and the end is not interchanged.

The question answering unit 106 calculates answer candidate scores, performs answer-determination processing to determine an answer candidate having the highest answer candidate score, and outputs the answer candidate as the answer. The answer candidate score is the probability (or likelihood, or certainty factor) of the string output as an answer candidate being the answer.

An example of the answer candidate score is a sum total obtained by summing up the answer suitabilities for each answer candidate. In this case, the question answering unit 106 performs the answer-determination processing to determine the answer candidate having the largest sum total, and outputs the answer candidate as the answer. Summing up the answer suitabilities means summing up the answer suitabilities for documents from which the answer candidate has been extracted. For example, with reference to the example in FIG. 3, assume that three documents whose answer candidate string is "Bendigo" are selected from among the input group of documents (corpus). Referring to the three documents as a document A, a document B, and a document C, in the case where the answer suitabilities for the document A, the document B, and the document C are 0.5, 0.6, and 0.2, respectively, 1.3 as the sum total of these values is treated as the answer candidate score for "Bendigo". Then, as described above, the answer candidate having the largest answer candidate score obtained by such summation is output as the answer.

Using the sum total described above as an answer candidate score is an example. As other examples of the method of calculating the answer candidate score, the following calculation methods (1) to (3) may be used. Also, the answer candidate score may be calculated by a method other than the sum total described above and the following (1) to (3).

(1) Weighted Sum

The answer candidate score may be calculated by calculating a sum total after giving weights to the answer suitabilities. As the weight, for example, a probability value as expressed in Formula 19 may be used. Specifically, for example, in the example described earlier where the answer candidate is "Bendigo", assuming that the weights of the document A, the document B, and the document C are WA, WB, and WC, respectively, and in the case where the answer suitabilities are 0.5, 0.6, and 0.2, respectively, the answer candidate score of "Bendigo" is calculated as WA×0.5+ WB×0.6+WC×0.2.

(2) Weighted Mean

The answer candidate score may be calculated by calculating a mean after giving weights to the answer suitabilities. As the weight, for example, a probability value as expressed in Formula 19 may be used. Specifically, for example, in the example described earlier where the answer candidate is "Bendigo", assuming that the weights of the document A, the document B, and the document C are WA, WB, and WC, respectively, and in the case where the answer suitabilities are 0.5, 0.6, and 0.2, respectively, the answer candidate score of "Bendigo" is calculated as (WA×0.5+WB×0.6+ WC×0.2)÷3. Also, the weight may be 1. In this case, the answer candidate score of "Bendigo" is calculated as (0.5+ 0.6+0.2)÷3.

(3) Total Number of Documents

The total number of documents may be used as the answer candidate score. Specifically, for example, in the example described earlier where the answer candidate is "Bendigo", the number of documents is three by the document A, the document B, and the document C; therefore, the answer candidate score in this case is 3.

For example, in the case where the corpus to be searched is constituted with Web documents such as blogs and news (it is highly likely that multiple documents having similar contents are included), with a setting of k=10 or the like, the question answering unit 106 may calculate the answer candidate score by summing up the answer suitabilities for each answer candidate, and perform the answer-determination processing to output an answer candidate having the largest answer candidate score as the answer, so as to be capable of outputting a more appropriate answer. This is because as the number of documents including the answer candidate increases, a higher possibility can be expected for the answer candidate being a more appropriate answer.

However, in the case where the corpus to be searched is Wikipedia and the like, the effect of the answer-determination processing is unlikely to be noticeable; therefore, with a setting of k=1 or the like, ($t_1$, $t_2$) may be obtained only for those having the highest answer suitability (answer candidate score), to extract a string to be output as the answer.

Note that the question answering unit 106 may output the answer candidate score together with the answer candidate having the highest answer candidate score. Also, the question answering unit 106 may output the answer suitability for each document including the answer candidate together with the answer candidate having the highest answer candidate score.

Also, the question answering unit 106 may obtain an answer range and an answer suitability for the question for each document in an input group of documents, to rank and output the documents in the group based on the answer ranges and the answer suitabilities.

Specifically, for example, assume that a group of documents including 'a' items of documents and one question are input into the question answering device 100. The question answering unit 106 obtains an answer range as a range of a string that can be an answer to the question for each of the 'a' items of documents. As has been described with Step 600, this answer range can be obtained as a position number at which the probability value expressed in Formula 19 is the highest.

Then, based on the answer range of each of the 'a' items of documents, and the answer suitability of each of the 'a' items of documents output from the answer suitability output unit 105, the question answering unit 106 sorts the 'a' items of documents (group of documents), for example, in descending order of the answer suitability, and outputs the sorted group of documents and the string in the answer range of each document in the group of documents. This enables to implement, for example, general FAQ search by the question answering device 100.

Thus, as described above, in the present embodiment, the question answering device 100 as described above is provided. The question answering device 100 includes the word sequence vectorizing unit 102 to encode word sequence of a document and a question into word vector series; the word sequence matching unit 103 to receive as input the word vector series of the document and the question, to output matching vector series (matching matrix) having the same series length as the document; the answer range output unit 104 to receive as input the matching matrix, to output the start number and end number of an answer range; the answer suitability output unit 105 that receives as input the matching matrix, to output the answer suitability indicating the degree of the document as an answerable document to the question; the parameter learning unit 107 to learn the parameters of the word sequence vectorizing unit 102, the word sequence matching unit 103, the answer range output unit 104, and the answer suitability output unit 105, based on the outputs of the answer range output unit 104 and the answer suitability output unit 105, and the answer range and answer suitability as the right answer; and the question answering unit 106 to find and output an answer to the input question in a group of documents (corpus), based on the outputs of the answer range output unit 104 and the answer suitability output unit 105.

Note that as the output, it is not mandatory to output both the answer range and the answer suitability, and either one of these may be output.

Second Embodiment

In the following, a second embodiment according to the present invention will be described with reference to the drawings. When searching for a document that is answerable to a question from among a large number of documents and outputting the answer range from a document as the search result, depending on the question, it may be appropriate to give an answer not only as the answer range at the phrase level, but also at the paragraph level in the document, or as the document itself; however, the conventional methods are not capable of implementing such a function. As an example, it is possible to consider that an answer is given at the phrase level for a question asking the capital of a country; at the paragraph level for a question related to conditions for insurance coverage; or at the document level for a question related to cooking (a recipe page itself).

In the second embodiment, a technique will be described that searches for an answerable document for a question from among a group of documents, and outputs an answer with an appropriate level of granularity from a document as the search result.

In the second embodiment, a range of an answer to a question at the phrase level will be referred to as the "answer range", and a range of an answer at the paragraph level will be referred to as the "answer paragraph". Note that the phrase is, for example, a range of words that includes one or more words, but is shorter than an entire paragraph (i.e., a range of one or more words not extending over paragraphs). Also, a "paragraph" in the second embodiment is a range of words that is longer than the answer range and shorter than a document. Also, in the second embodiment, as an example, one type of range referred to as the "paragraph" is used as a range of words that is longer than the answer range and shorter than a document; however, there may be multiple types of ranges of words that are longer than the answer range and shorter than a document.

In other words, what is assumed in the second embodiment is a nested structure of phrase <paragraph <document as the ranges of strings that can be an answer, and in this case, three types of answering are possible with the "answer range, answer paragraph, and answer document". Also, for example, it is possible to introduce finer levels of granularity, such as phrase <small paragraph <middle paragraph <large paragraph <document. Both of the "answer range, answer paragraph, and answer document" and the "answer range, small answer paragraph, middle answer paragraph, large answer paragraph, and answer document" as such are examples of ranges giving answers at multiple levels of granularity. The technique according to the second embodiment enables to output a range at an appropriate level of granularity from a document as the search result, from among the ranges giving answers at multiple levels of granularity.

The question answering device in the second embodiment may be a device independent of the question answering device described in the first embodiment, or may include all the functions of the question answering device described in the first embodiment, and additionally includes a function of outputting an answer at an appropriate level of granularity, as will be described in the following.

Overview of the Second Embodiment

In the second embodiment, the question answering device outputs, from a word sequence of a document given as input, a range, a paragraph, or a document as an answer part to a question. In particular, the question answering device simultaneously performs learning of a reading comprehension task that extracts a range of an answer part in the document; a paragraph selection task to select an answer paragraph in the document; and a search task that determines whether the document includes answerable information for the question, so as to be capable of improving the precision of each of the tasks.

More specifically, the question answering device has neural networks that perform document search, paragraph selection in a document, and answer range extraction (reading comprehension), and share part of the layers; this enables to simultaneously perform learning of the three tasks, to improve the precision of each of the tasks, and to answer a question at an appropriate level of granularity.

(Device Configuration and Overview of Operations)

Figure 9:
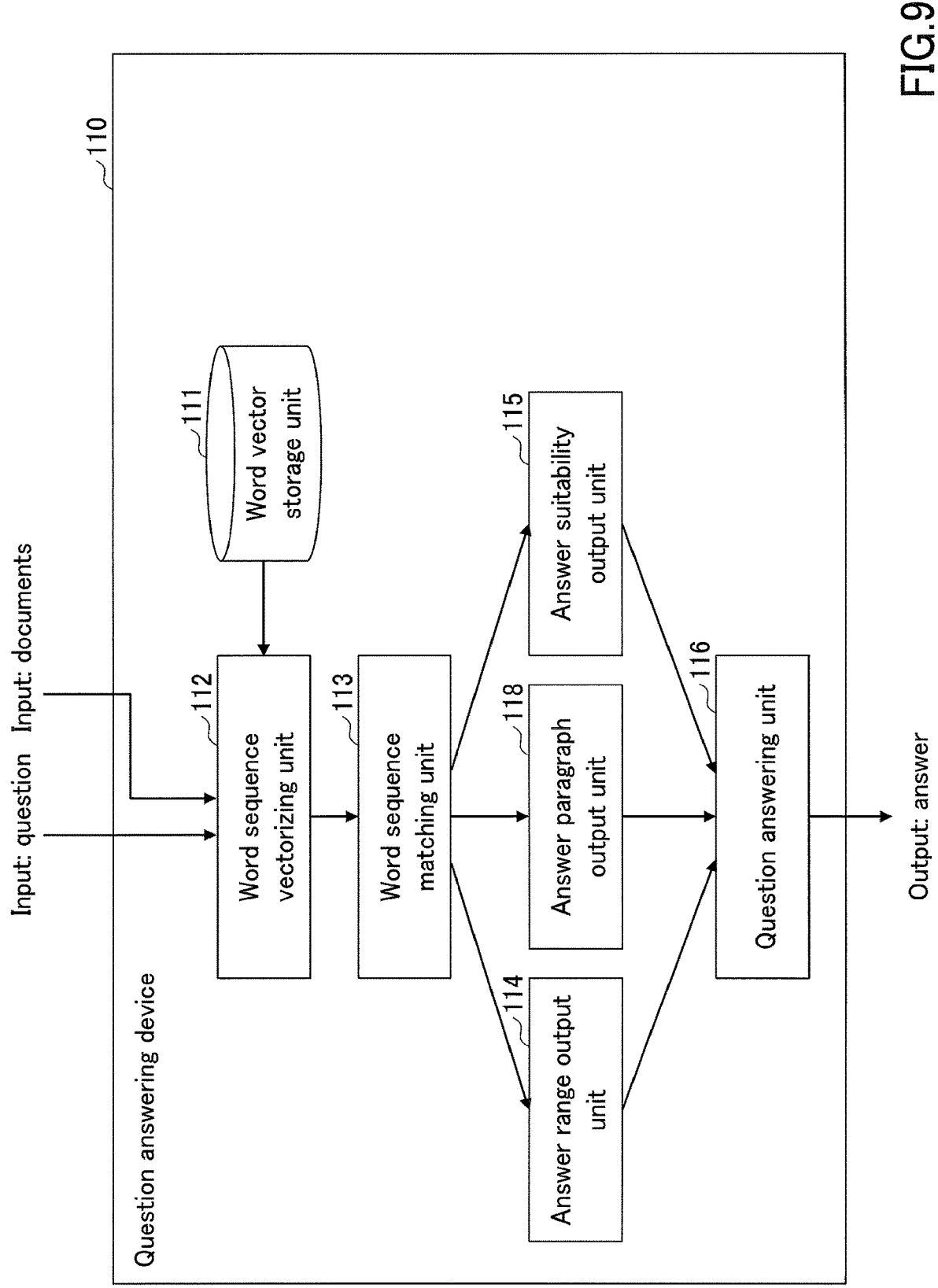
FIG. 9 is a configuration diagram of a question answering device 110 in a second embodiment according to the present invention.

FIG. 9 illustrates a configuration of a question answering device 110 in the second embodiment according to the present invention. The configuration illustrated in FIG. 9 is a configuration during a process of question answering. As illustrated in FIG. 9, the question answering device 110 includes a word vector storage unit 111, a word sequence vectorizing unit 112, a word sequence matching unit 113, an answer range output unit 114, an answer paragraph output unit 118, an answer suitability output unit 115, and a question answering unit 116.

Figure 10:
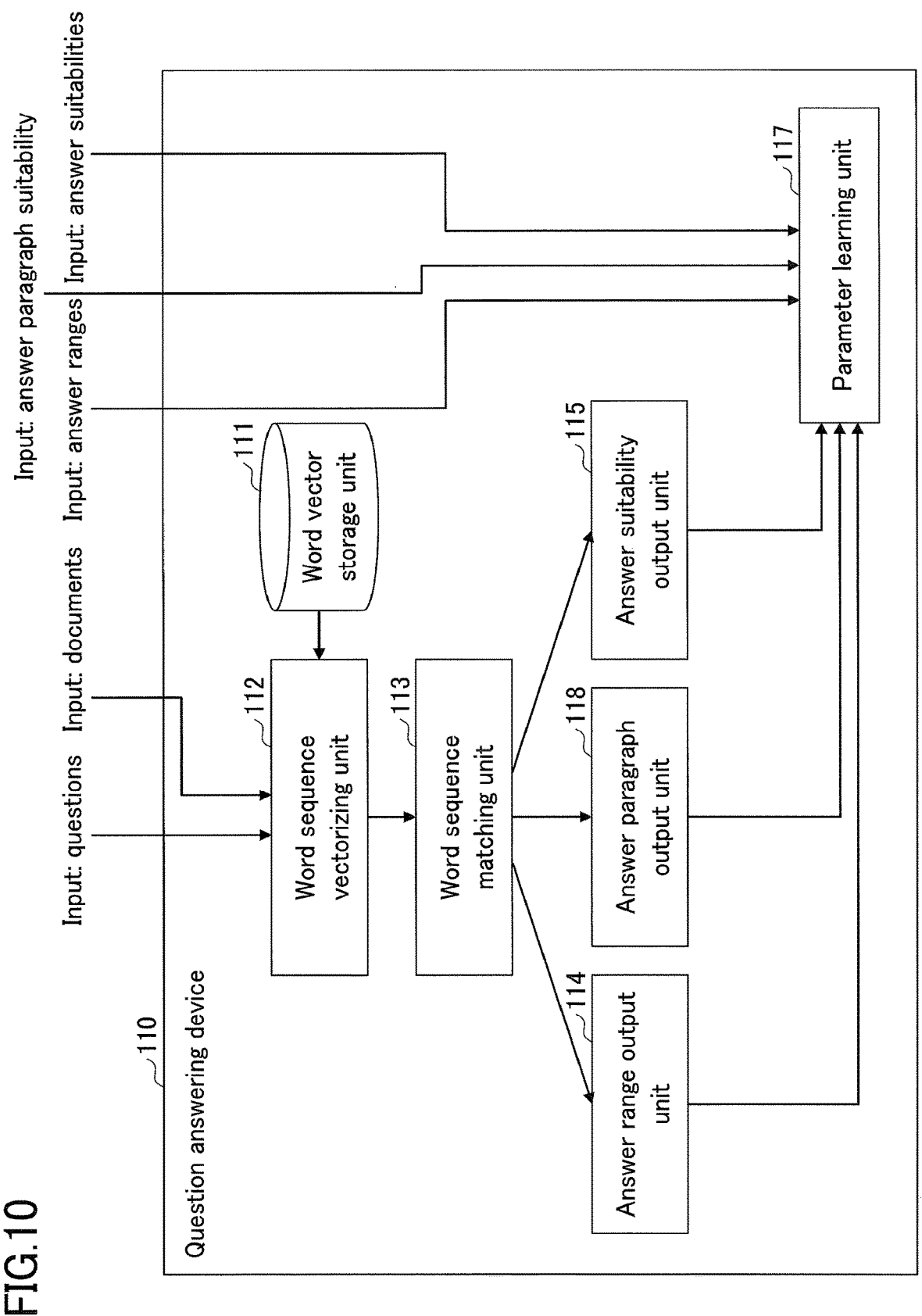
FIG. 10 is a configuration diagram of the question answering device 110 during learning in the second embodiment according to the present invention.

FIG. 10 illustrates a configuration of the question answering device 110 during the learning. The question answering device 110 during the learning differs from the configuration of the question answering device 110 in FIG. 9, in that the question answering unit 116 is not provided, and instead, a parameter learning unit 117 is provided. The other elements are the same between the configuration during the process of question answering and the configuration during the learning.

A configuration obtained by adding the parameter learning unit 117 to the configuration in FIG. 9 may be considered as the configuration of the question answering device 110. In this case, FIG. 9 illustrates a configuration used during the process of question answering, and FIG. 10 illustrates a configuration used during the learning. In the following, the "question answering device 110" will be described, assuming a configuration obtained by adding the parameter learning unit 117 to the configuration in FIG. 9. Note that the question answering unit 116 may exist outside the question answering device 110. Details of the operation of each unit will be described later.

Each functional unit of the question answering device 110 (specifically, each layer of the neural networks) performs learning in advance by using a training data set constituted with multiple tuples of (question, document, answer range, answer paragraph, and answer document suitability). Here, "learning" means appropriately determining parameters (weights and the like) in a neural network so as to output target information with respect to input.

Then, with respect to a question and a set of documents (here, referred to as test data) to be input, each pair of the question and a document included in the set of documents is input into the learned question answering device 110, to output an answer extracted from a document having a high answer suitability. Data with respect to the answer range, answer paragraph, answer document suitability that serves as the right answer is given only during the learning, and not given during the testing (during outputting an answer to an input question). The answer range is a part (phrase) corresponding to an answer to a question in a document. Note that each data item may not have all of the answer range, answer paragraph, and answer document suitability as the right answers, but may have part of the right answers.

An image in the case where the question answering device 110 outputs an answer to an input question is substantially the same as in the first embodiment, and as illustrated in FIG. 3.

In the training data set as input into the question answering device 100 during the learning illustrated in FIG. 10, a document including an answer to the question is set as a right-answer document. There may be multiple right-answer documents for a question. It is assumed that there may be one or more answer ranges in each right-answer document. The answer suitability is set to, for example, 1 if being a right-answer document, or 0 otherwise.

In the question answering device 110, a functional unit that calculates an answer range, answer paragraph, an answer suitability from a document and a question is implemented by neural networks. A neural network is a mathematical model, and the functional unit in the question answering device 110 is implemented by software (and a processor such as a CPU or GPU) that performs operations on the mathematical model corresponding to the neural networks.

Figure 11:
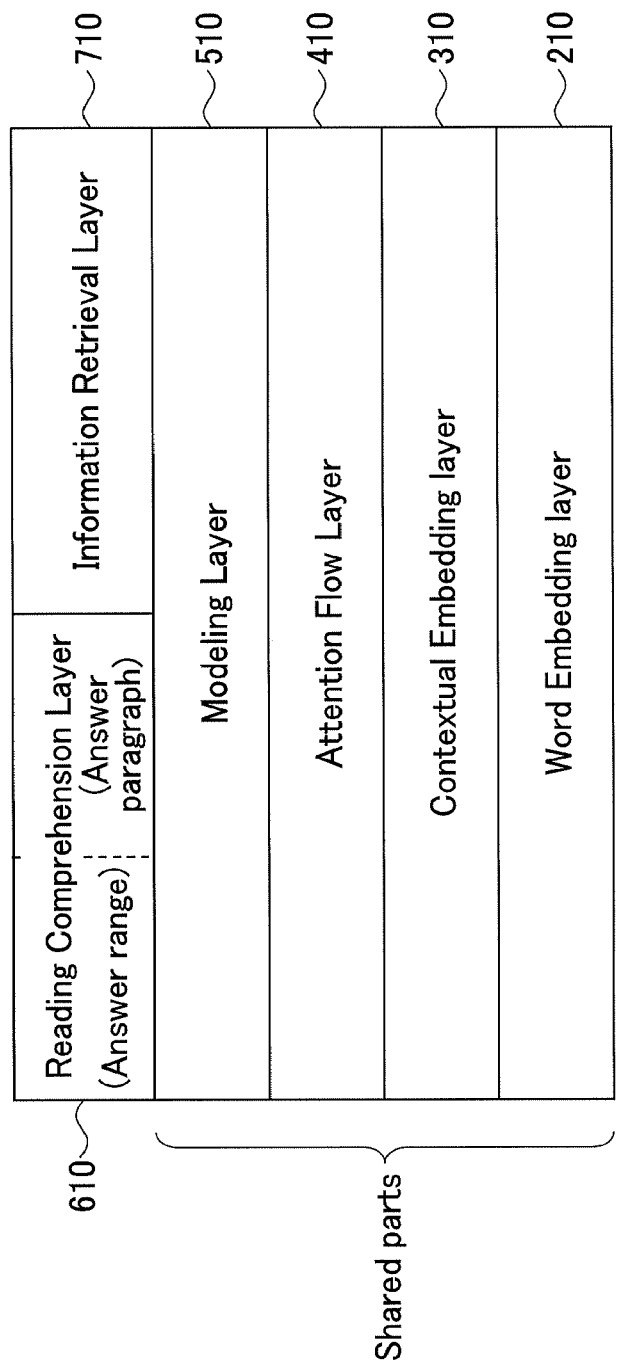
FIG. 11 is a diagram illustrating a configuration of a model.

FIG. 11 illustrates an example of a configuration of a neural network used by the question answering device 100. Although the configuration is based on a configuration disclosed in Non-Patent Document 1, in the present embodiment, part of the layers in the neural network is shared between information search and reading comprehension, and in this regard, no disclosure is found in Non-Patent Document 1.

As illustrated in FIG. 11, the neural networks constituting the question answering device 110 includes a word embedding layer 210, a contextual embedding layer 310, an attention flow layer 410, a modeling layer 510, a reading comprehension layer 610, and an information retrieval layer 710.

The word embedding layer 210 and the contextual embedding layer 310 correspond to the word sequence vectorizing unit 112. The attention flow layer 410 and the modeling layer 510 correspond to the word sequence matching unit 113. The reading comprehension layer 610 includes a layer related to reading comprehension, and corresponds to the answer range output unit 114 and the answer paragraph output unit 118. The information retrieval layer 710 includes a layer related to information search, and corresponds to the answer suitability output unit 105.

As illustrated in FIG. 11, the word embedding layer 210, the contextual embedding layer 310, the attention flow layer 410, and the modeling layer 510 are shared between information search and reading comprehension.

Processing performed by the question answering device 110 is summarized as follows. Details of H, U, and M in the following description will be described later in the detailed description.

First, the word sequence vectorizing unit 112 converts a document and a question sentence, which have been input, into a vector series H and a vector series U, respectively. Next, the word sequence matching unit 113 calculates a matching matrix M based on the vector series H of the document and the vector series U of the question. The answer range output unit 114 calculates an answer range and an answer paragraph based on the matching matrix M. The answer suitability output unit 105 outputs an answer suitability based on the matching matrix M. The question answering unit 116 extracts and outputs a string to be given as an answer, as will be described later.

During the learning, the parameter learning unit 117 performs processing based on a training data set (constituted with multiple tuples of (question, document, answer range, answer paragraph, and answer document suitability)), to perform a loss calculation by using the input answer range, answer paragraph (as a right answer), and answer suitability, and the output answer range, answer paragraph, and answer suitability, so as to update the parameters of the neural networks.

As the training data set, instead of giving an answer range as the right answer to the question, it is possible to give an answer string as the right answer to the question, and to use a range in which the answer string as the right answer is included by exact match in the document, or a range in which the greatest number of overlaps is included by partial match, instead of the answer range of the right answer, so as to perform learning. However, giving an answer range as the right answer enables to provide a more accurate answer; therefore, it is desirable to give an answer range as the right answer.

(Example of Hardware Configuration)

The question answering device 110 described above can be implemented by, for example, causing a computer to execute a program describing the processing contents described in the second embodiment. In other words, the question answering device 110 can be implemented by executing a program corresponding to the processing performed on the question answering device 110 using hardware resources such as a CPU and a memory that are built in the computer. The above program may be recorded on a computer-readable recording medium (a portable memory etc.) so as to be saved or distributed. Also, the above program may be provided through a network such as the Internet and by using e-mail. An example of the hardware configuration and examples of operations of the computer in the second embodiment are substantially the same as those in the first embodiment, and an example of the hardware configuration is as illustrated in FIG. 5.

(Detailed Processing Contents)

In the following, a specific detailed example of the processing executed by the question answering device 110 in the second embodiment will be described.

<Processing During Learning>

Figure 12A:
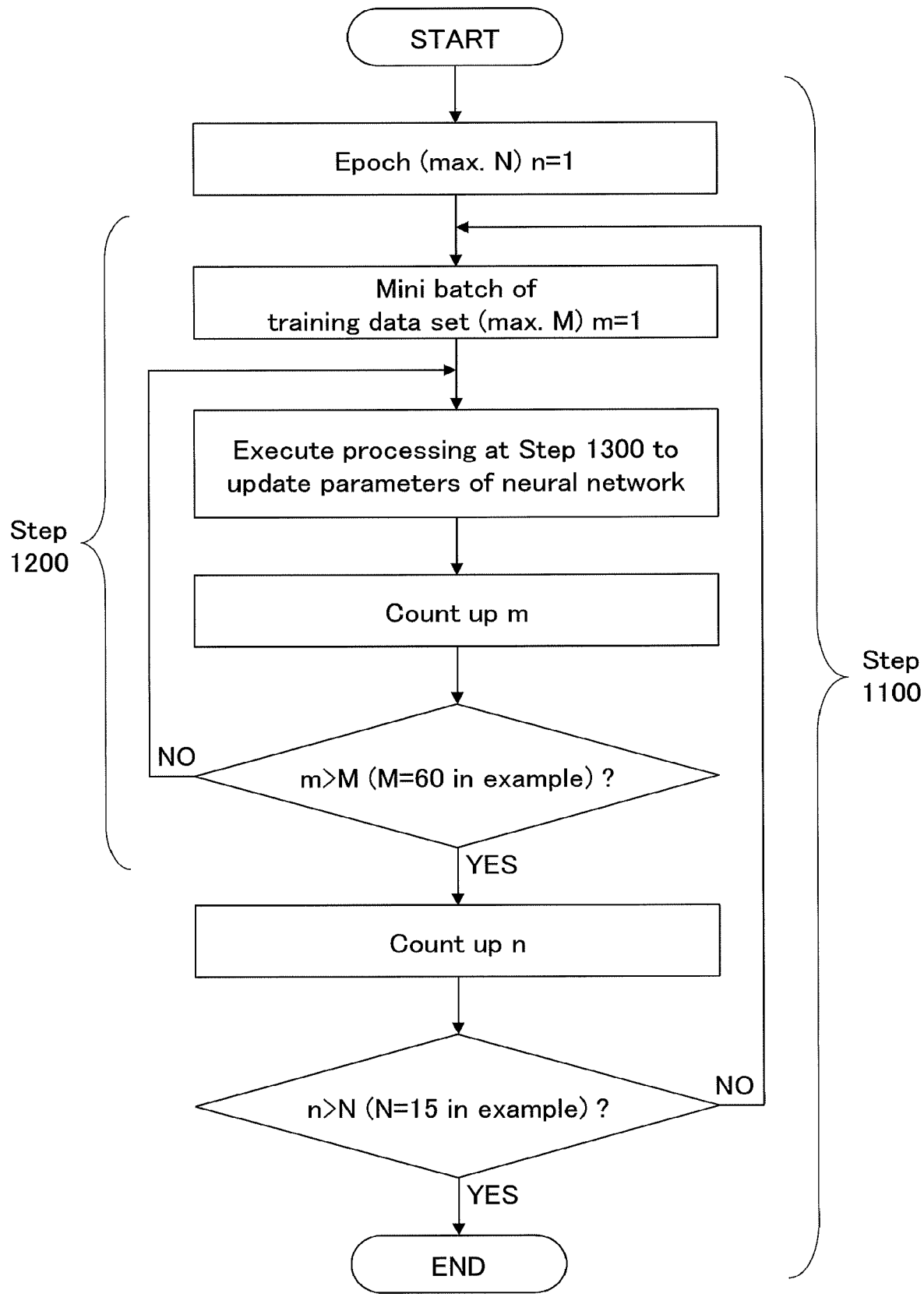
FIG. 12A is a flow chart illustrating processing steps of the question answering device 110 during learning.

FIG. 12A is a flow chart illustrating processing steps of the question answering device 110 during learning in the present embodiment. An example of processing steps executed by the question answering device 110 during the learning will be described along steps in FIG. 12A. Here, as an example, the unit of learning is referred to as an epoch. Note that M in the flow chart represents the maximum number of mini-batches; m represents the count value of mini-batches; N represents the maximum number of epochs; and n represents the count value of epochs. M, m, N, and n are unrelated to the parameters in the neural networks.

Step 1100) The question answering device 110 repeats the processing at Step 1200 for the number of epochs denoted as N. In the present embodiment, N=15. As illustrated in FIG. 12A, starting from an epoch count value n=1, n is counted up each time the processing at Step 1200 is completed for one epoch, and the flow ends when n>N.

Step 1200) The question answering device 110 partitions the training data set into data items of mini-batches up to the maximum of M mini-batches, and repeats processing at Step 1300 for each mini-batch. In the present embodiment, M=60. As illustrated in FIG. 12A, starting from a mini-batch count value m=1, m is counted up each time the processing at Step 1300 is completed for one minibatch, and when m>M, the processing transitions to the next epoch. Note that partitioning into mini-batches is an example, and it is possible to perform the processing without partitioning into mini-batches.

Step 1300) Steps 1310 to 1370 as follows are performed for each data item constituting a mini-batch (M times for all).

Figure 12B:
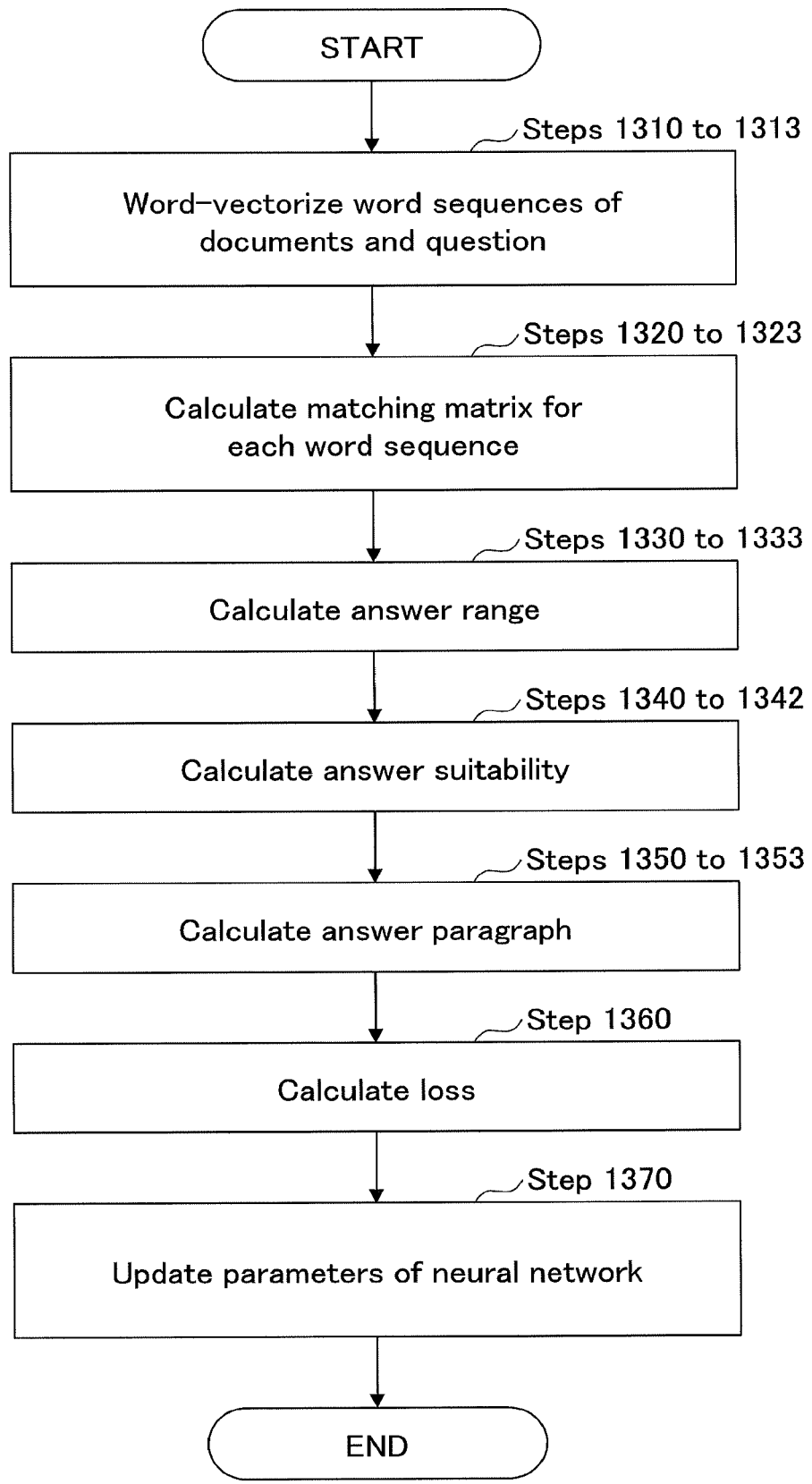
FIG. 12B is a flow chart illustrating processing steps at Step 1300.

In the following, the contents of the processing to be performed at Step 1300 described above will be described along steps illustrated in a flow chart in FIG. 12B. Note that as in the first embodiment, a number starting from 1 assigned to each word in an input document from the beginning to the end of the document will be referred to as a position number.

Step 1310) The word sequence vectorizing unit 112 searches in the word vector storage unit 111 for each word included in a word sequence $(x_1, x_2, \ldots, x_T)$ of the first to T-th words of the document, and converts the word sequence into a vector series of word vectors $e_t$ each corresponding to the t-th word $x_t$.

$$X = [e_1 \ e_2 \ \ldots \ e_T] \in R^{E \times T} \qquad \text{(Formula 21)}$$

where T is the number of words set discretionarily. If an input word sequence has a length of less than T, a special word "PAD" is inserted at the end. If a word sequence exceeds T, the exceeding part of the word sequence is ignored. In the present embodiment, T=400 and E=300.

FIG. 13 illustrates an example of data stored in the word vector storage unit 111. As in the first embodiment, in the word vector storage unit 111, pairs of (word, word vector) generated by a method as described in Reference 1 or the like are stored, and the dimensionality of the word vector is E. Note that titles of references are listed at the end of the Description. In the case of a word not included in the word vector storage unit 101 and the special word "PAD", the word vector is assumed to be an E-dimensional zero vector. Note that a word vector as stored in the word vector storage unit 101 may be included as a learnable parameter of a neural network.

Step 1311) The word sequence vectorizing unit 112 converts a vector series X of the document into a vector series H having a size of 2d×T, by a bidirectional LSTM (hidden state size d) shown in Reference 2. In the present embodiment, d=100.

Step 1312) The word sequence vectorizing unit 112 searches in the word vector storage unit 111 for each word included in a word sequence of the question $(q_1, q_2, \ldots, q_J)$ of the first to J-th words of the question sentence, and converts the word sequence into a vector series of word vectors $e_j$ each corresponding to the j-th word $q_j$.

$$Q = [e_1 \ e_2 \ \ldots \ e_J] \in R^{E \times J} \qquad \text{(Formula 22)}$$

where J is the number of words set discretionarily. If an input word sequence has a length of less than J, a special word "PAD" is inserted at the end. If a word sequence exceeds J, the exceeding part of the word sequence is ignored. In the present embodiment, J=30.

Step 1313) The word sequence vectorizing unit 112 converts a vector series Q of the question into a vector series U having a size of 2d×J, by a bidirectional LSTM (hidden state size d) shown in Reference 2.

Step 1320) The word sequence matching unit 113 calculates a matching matrix S based on the vector series H of the document and the vector series U of the question. Each element $S_{ij}$ of the matrix S is obtained as follows, by using a vector $H_t$ of the i-th word $x_t$ of the document and a vector $U_j$ of the j-th word $q_j$ of the question sentence. The matching matrix S represents a semantic matching result between the document and the question.

$$S_{tj} = w_S^t[H_t; U_j; H_t \circ U_j] \in R \qquad \text{(Formula 23)}$$

In the above formula, ○ denotes the element-wise product of vectors, and ';' denotes concatenation of vectors.

$$w_S \in R^{6d} \quad \text{(Formula 24)}$$

is a model parameter to be learned. Note that as for t used in the present Description, a superscript t denotes transposition, and a subscript t denotes the position number of a word.

Step 1321) The word sequence matching unit 113 calculates an attention-weighted mean vector "$\tilde{U}_t$" based on the matching matrix S. Note that as in the first embodiment, for the sake of convenience for describing in the Description, in the text of the Description, "X having a wavy line on the top" is expressed as X~. "$\tilde{U}_t$" is calculated by the following formula.

$$\tilde{U}_t = \sum_{j=1}^{J} a_{tj} U_j \in R^T \quad \text{(Formula 25)}$$

In the above formula, $a_t$=softmax$_j$ (St)∈ $R^J$ where $S_t$ is a vector at the t-th row of S; and softmax is an example of an activation function.

Step 1322) The word sequence matching unit 113 calculates a vector series G by the following formula.

$$G = [H; \tilde{U}; H \circ \tilde{U}] \in R^{6d \times T} \quad \text{(Formula 26)}$$

Step 1323) The word sequence matching unit 113 converts the vector series G into a matching matrix M∈ $R^{2d \times T}$ by a single-layer bidirectional LSTM (hidden state size d). Each column of the matching matrix M now represents a meaning of each word $x_t$ depending on the question.

Step 1330) The answer range output unit 114 converts the matching matrix M into $M^1$∈ $R^{2d \times T}$ by a single-layer bidirectional LSTM (hidden state size d). $M^1$ is a matching matrix for calculating the start of an answer.

Step 1331) The answer range output unit 114 outputs a probability distribution $p^1$ with respect to the start of the answer.

$$p^1 = \text{softmax}(w_{p^1}{}^t M^1) \in R^T \quad \text{(Formula 27)}$$

$$w_{p^1} \in R^{2d} \quad \text{(Formula 28)}$$

is a learnable parameter.

Step 1332) The answer range output unit 114 converts $M^1$ into $M^2$∈ $R^{2d \times T}$ by a single-layer bidirectional LSTM (hidden state size d). $M^2$ is a matching matrix for calculating the end of an answer. In order to calculate the end considering the start, $M^2$ is generated based on $M^1$ instead of M.

Step 1333) The answer range output unit 114 outputs a probability distribution $p^2$ with respect to the end of the answer.

$$p^2 = \text{softmax}(w_{p^2}{}^t M^2) \in R^T \quad \text{(Formula 29)}$$

$$w_{p^2} \in R^{2d} \quad \text{(Formula 30)}$$

is a learnable parameter.

Step 1340) The answer suitability output unit 115 converts the matching matrix M into $M^r$∈ $R^{2d \times T}$ by a single-layer bidirectional LSTM (hidden state size d).

Step 1341) The answer suitability output unit 115 calculates a weighted mean vector m~ by the following formula.

$$\tilde{m} = \sum_{t=1}^{T} \beta_t M_t^r \in R^{2d} \quad \text{(Formula 31)}$$

where the weight β is calculated as follows.

$$m_t = W_a M_t^r + b_a \quad \text{(Formula 32)}$$

$$\beta = \frac{\exp(m_t \cdot w_c)}{\sum_{t=1}^{T} \exp(m_t \cdot w_c)} \quad \text{(Formula 33)}$$

In the above, $W_a \in R^{c \times 2d}$, $b_a \in R^c$, and $w_c \in R^c$ are learnable parameters; and c is the size of an attention vector. In the present embodiment, c=75.

Step 1342) The answer suitability output unit 115 calculates an answer suitability by the following formula.

$$p^r = \text{sigmoid}(w_{p^r}{}^t \tilde{m}) \in [0, 1] \quad \text{(Formula 34)}$$

$$w_{p^r} \in R^{2d} \quad \text{(Formula 35)}$$

is a learnable parameter; and sigmoid is an example of an activation function.

Step 1350) The answer paragraph output unit 118 converts the matching vector M into $M^s$∈ $R^{2d \times T}$ by a single-layer bidirectional LSTM (hidden state size d).

Step 1351) The answer paragraph output unit 118 performs the following for each paragraph l. Each paragraph l is assigned a position number, for example, 1, 2, 3, and so on, in the order starting from the first paragraph of the document. A position number indicating the start position of the paragraph is denoted as $l_1$, and a position number indicating the end position is denoted as $l_2$. For example, $l_1$ is 1, and $l_2$ is the number of paragraphs in the document. Note that each paragraph l is defined in advance in an input document. For example, in the case of a document being a Web document, each paragraph can be defined as a range enclosed in predetermined tags.

Step 1352) The answer paragraph output unit 118 calculates a weighted mean vector $\bar{m}_l$.

$$\bar{m}_l = \sum_{t=l_1}^{l_2} \gamma_t M_t^s \in R^{2d} \quad \text{(Formula 36)}$$

Here, the weight γ is calculated as follows.

$$m'_t = W_b M^s_t + b_b \quad \text{(Formula 37)}$$

$$\gamma_t = \frac{\exp(m'_t \cdot w_d)}{\sum_{t'=l_1}^{l_2} \exp(m'_{t'} \cdot w_d)} \quad \text{(Formula 38)}$$

$W_b \in R^{c \times 2d}$, $b_b \in R^c$, and $w_d \in R^c$ are learnable parameters; and c is the size of an attention vector. In the present embodiment, c=75.

Step 1353) The answer paragraph output unit 118 calculates a score for each paragraph.

$$p^s = sigmoid\left(w^{s^t} \hat{m}\right) \in [0, 1] \quad \text{(Formula 39)}$$

In the above formula, $w^s \in R^{2d}$ is a learnable parameter.

Step 1360) The parameter learning unit 117 uses an answer document suitability existence variable ($\sigma_{IR}$=1 if the answer document suitability is given as right answer data, 0 if not); an answer range existence variable ($\sigma_{RC}$=1 if the answer range is given as right answer data, 0 if not); an answer paragraph existence variable ($\sigma_{AS}$=1 if the answer paragraph is given as data, 0 if not); an answer document suitability of a right answer $y^r \in \{0, 1\}$ (1 indicates an answerable document for a question, 0 indicates otherwise); an answer paragraph of a right answer (integer satisfying $1 \leq y^s$); an answer range of a right answer (integers satisfying $1 \leq y^1, y^2 \leq T$); an answer document suitability of an output $p^r$; the answer range of the output ($p^1, p^2$); an answer paragraph of an output $p^s$; a constant $\lambda$; and a constant $\omega$, to calculate the loss as follows. AS stands for Answer Selection.

$$L = \sigma_{IR} L_{IR} + \sigma_{RC} \lambda L_{RC} + \sigma_{AS} \omega L_{AS} \quad \text{(Formula 40)}$$

where $$L_{IR} = -t^r \log p^r - (1 - t^r) \log(1 - p^r) \quad \text{(Formula 41)}$$

$$L_{RC} = -\log p^1_{y^1} - \log p^2_{y^2}$$

$$L_{AS} = -\log p^s_{y^s}$$

In the present embodiment, $\lambda$=1 and $\omega$=1. Here, $$p^1_{y^1} \quad \text{(Formula 42)}$$

is the value of a position number $y^1$ in the probability distribution $p^1$.

$$p^2_{y^2} \quad \text{(Formula 43)}$$

is the value of a position number $y^2$ in the probability distribution $p^2$.

$$p^s_{y^s} \quad \text{(Formula 44)}$$

is the value of the paragraph position $y^s$ in the probability distribution $p^s$. Part of the answer document suitability of a right answer, the answer paragraph of a right answer, and the answer range of a right answer may not be given in training data. In other words, the training data simply needs to include minimum information (question, document, and answer document suitability) among the elements (question, document, answer range, answer paragraph, and answer document suitability). Also, thanks to the nested structure of answer range <answer paragraph <answer document, it is possible to automatically define the document suitability from the answer paragraph, and the answer paragraph and the answer document suitability from the answer range. Note that the paragraph position is a position number to identify an answer paragraph of a right answer.

Step 1370) The parameter learning unit 117 averages the loss L for data items calculated at Step 1360 with respect to the mini-batch, and optimizes learnable parameters of all the neural networks by a stochastic gradient descent method, to update the parameters. Note that the present invention does not depend on the optimization method, and other optimization methods may be used.

The processing at Step 1340 described above may be replaced with processing at Step 1340' described below.

Step 1340') The answer suitability output unit 115 calculates an exact matching matrix $B \in R^{J \times T}$ in which an element at the j-th row and the t-th column is set to 1 if the j-th word in the question exactly matches the t-th word in the document, or set to 0 otherwise. Next, the maximum value is taken for each column of B, to obtain b=$\max_j(B) \, R^{1 \times T}$. Each element of b (vector of a length T) takes 1 if the word in the document corresponding to the element is present in the question, or 0 if not.

[M;b]$\in R^{(J+1)\phi T}$ obtained by concatenating the matching matrix M with b is converted into $M^r \, E \, R^{2d \times T}$ by a single-layer bidirectional LSTM (hidden state size d). In the case of performing the processing at Step 1340', $M^r$ obtained from [M;b] in this way is used as $M^r$ at Steps 1341 to 1342.

Taking the exact match into consideration as in Step 1340' enables to emphasize that words in the question are included in the document, and hence, to make it easier to take the intention of the question into account. Therefore, the search precision can be improved.

<Processing Contents During Testing (when Outputting an Answer for a Question)>

Figure 14A:
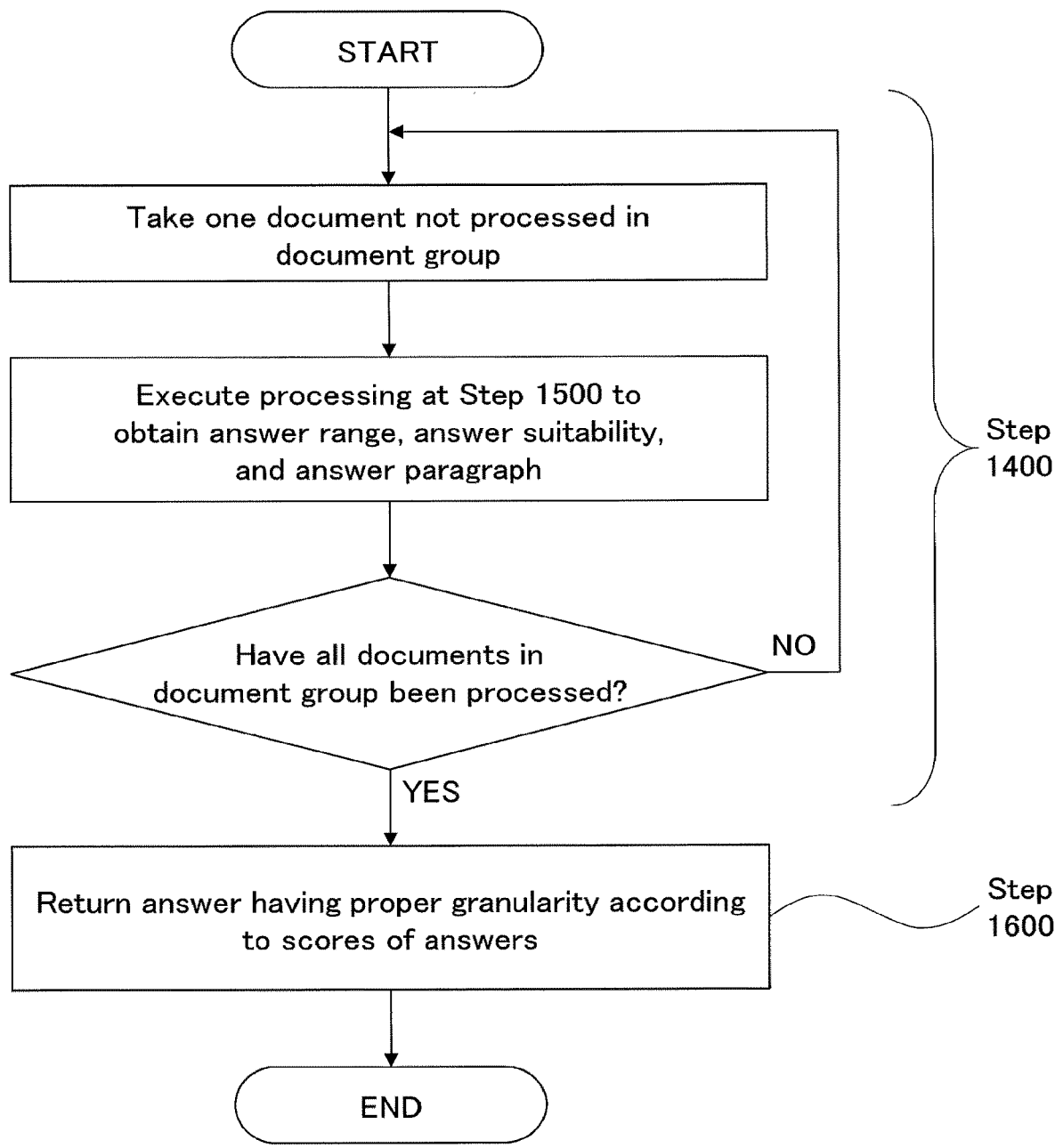
FIG. 14A is a flow chart illustrating processing steps of the question answering device 100 during question answering.

FIG. 14A is a flow chart illustrating processing contents while testing the question answering device 110 in the second embodiment. In the second embodiment, during the testing, the question answering device 110 receives as input a group of documents (a corpus to be searched) and a word sequence of a question, and outputs an answer extracted from a document. Note that the group of documents is constituted with one or more documents. In the following, along steps illustrated in FIG. 14A, processing contents of the question answering device 110 during the testing will be described.

Step 1400) The question answering device 110 repeats Step 1500 for each document included in the document corpus to be searched. In other words, as illustrated in FIG. 14A, processing at Step 1500 is executed for each document until the processing at Step 1500 is completed for all documents in the group of documents, to obtain answer ranges, answer suitabilities, and answer paragraphs.

Figure 14B:
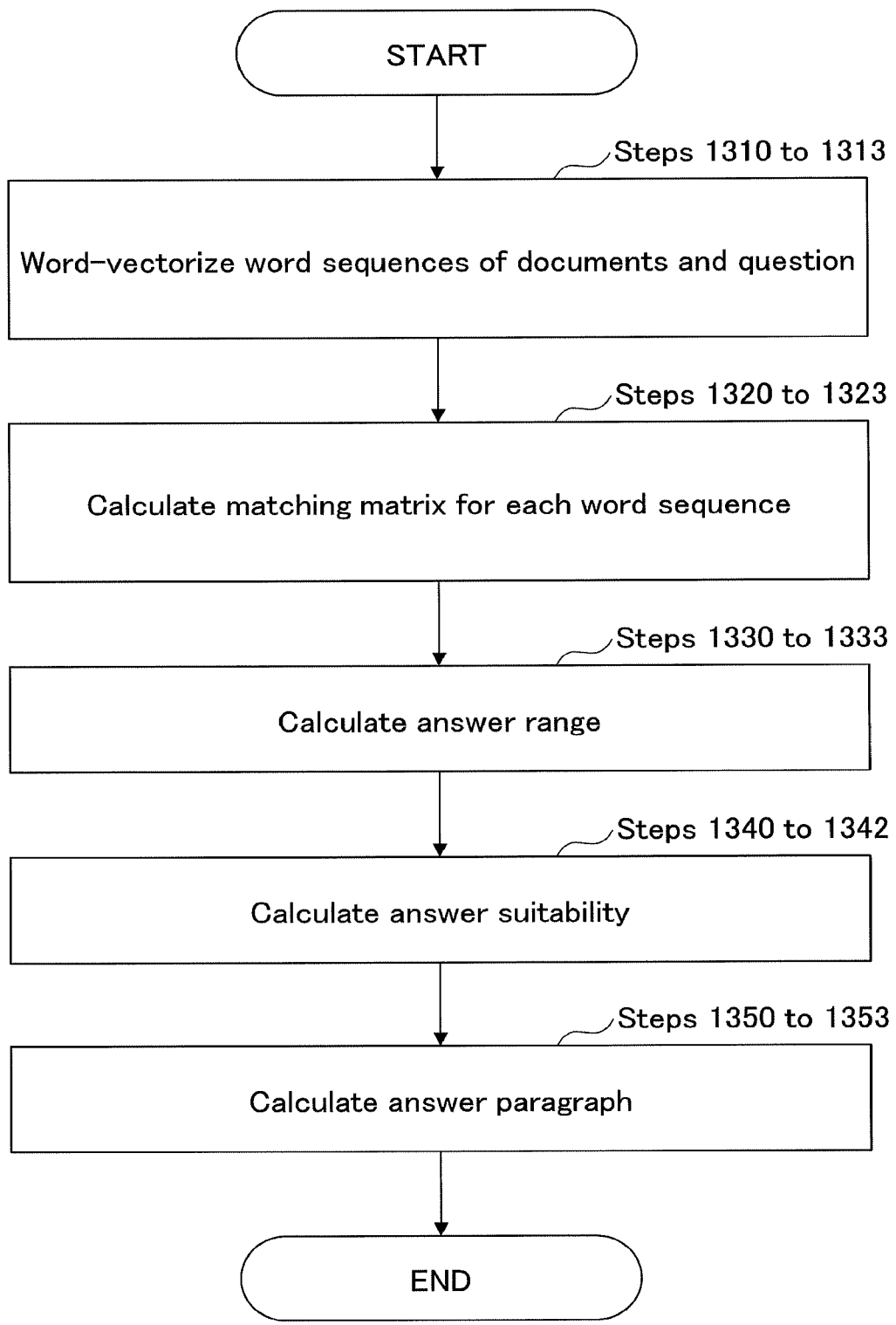
FIG. 14B is a flow chart illustrating processing steps at Step 500.

Step 1500) Processing similar to Steps 1310 to 1353 of the flow chart during the learning (FIG. 14B) is performed for the document and the word sequence of the question, to output the answer suitability $p^r$, the answer range ($p^1, p^2$), and the answer paragraph $p^s$. As for Step 1340, the processing at Step 1340' described above may be performed instead of Step 1340.

Step 1600) The question answering unit 116 selects a document i having the highest answer suitability. For the selected document, $(t_1, t_2)$ is obtained that gives the highest value by dynamic programming as follows.

$$p_{t_1}^1 p_{t_2}^2 \quad \text{(Formula 45)}$$

Step 1601) The question answering unit 116 extracts a string corresponding to the range of $(t_1, t_2)$ of the word sequence of the document, to set the string as the answer string, if $$p_{t_1}^1 p_{t_2}^2 \quad \text{(Formula 46)}$$

is greater than or equal to a threshold $\theta^r$.

Step 1602) The question answering unit 116 obtains a paragraph l that gives the greatest value of Formula 48, if $$p_{t_1}^1 p_{t_2}^2 \quad \text{(Formula 47)}$$

is less than the threshold Or.

$$p_l^s \quad \text{(Formula 48)}$$

Step 1603) The question answering unit 116 extracts a string corresponding to the paragraph l from the document, to set the string as the answer string, if $$p_l^s \quad \text{(Formula 49)}$$

is greater than or equal to a threshold $\theta^s$.

Step 1604) The question answering unit 116 sets the string of the document i as the answer string, if $$p_l^s \quad \text{(Formula 50)}$$

is less than a threshold $\theta^s$.

Step 1605) The question answering unit 116 returns the answer string determined by processing at Steps 1601 to 1604.

As in the first embodiment, the question answering unit 116 may extract a string (referred to as an answer candidate string) by the method described above for each document in the input group of documents, and then, calculate the answer candidate score for each answer candidate string, to output an answer candidate string having the highest answer candidate score as the final answer string. As in the first embodiment, the answer candidate score is, for example, a value obtained by summing up the answer suitabilities of documents having the same answer candidate string. Also, as in the first embodiment, a weighted sum, a weighted mean, the total number of documents, or the like may be used as the answer candidate score.

As described above, in the second embodiment, the above-described question answering device 110 is provided. The question answering device 110 includes the word sequence vectorizing unit 112 to encode word sequence of a document and a question into word vector series; the word sequence matching unit 113 to receive as input the word vector series of the document and the question, to output matching vector series (matching matrix) having the same series length as the document; the answer range output unit 114 to receive as input the matching matrix, to output the start number and end number of an answer range; the answer suitability output unit 115 to receive as input the matching matrix, to output the answer document suitability indicating the degree of the document as an answerable document to the question; the answer paragraph output unit 108 to receive as input the matching matrix, to output an appropriate paragraph number in the document as the answer to the question; the parameter learning unit 107 to learn the parameters of the word sequence vectorizing unit 112, the word sequence matching unit 113, the answer range output unit 114, the answer paragraph output unit 118, and the answer suitability output unit 115, based on the outputs of the answer range output unit 114, the answer paragraph output unit 118, and the answer suitability output unit 115, and some or all of the answer range, the answer paragraph, and the answer document suitability as the right answers; the question answering unit 116 to find and output an answer to the input question in a corpus, based on the outputs of the answer range output unit 114, the answer paragraph output unit 118, and the answer suitability output unit 115.

According to the second embodiment, it is possible to search for an answerable document for a question from among a group of documents, and to output an answer with the most appropriate level of granularity from a document as the search result. In other words, an effect is obtained such that after having narrowed down an answerable document to a question from among a large number of documents, an answer can be given at one of the levels of, for example, a document, a paragraph, and an answer range, from the documents with a higher precision than ever.

The "appropriateness" in the above "appropriate level of granularity" is based on the probability (may be referred to as likelihood, certainty factor, etc.) as expressed by Formula 45 or Formula 48, and the answer candidate score.

Also, although the cost of generating training data increases in the order of the document level, paragraph level, and phrase level, according to the second embodiment, as long as at least right answer information at the document level is given as training data, it is possible to perform learning; therefore, unnecessary annotation cost can be controlled, and training data given at various answer range levels can be used together.

(Experimental Results)

An experiment was conducted using the question answering device 100 according to the first embodiment. As a data set used in the experiment, a development set of SQuAD (Reference document 3) was used.

Binary relevance judgments were used as evaluation indicators for the information search task in the question answering device 100. Success@k represents a percentage of the number of times that a related document appears in the top k search documents to a certain question (Reference 4). MRR@k represents the mean reciprocal rank of the first related document (Reference document 5).

As the evaluation indicator for the reading comprehension task and the end-to-end question answering task, the same evaluation indicator (EM (Exact match)) was used as used in SQuAD.

In the experiment, the hidden state size d of an LSTM was set to 100, and the hidden state size c used for the attention score calculation of the information search was set to 100. Also, λ was set to 1. The number of epochs was set to 15.

FIG. 15 shows results of the information search for the SQuAD development set, presented by a mean of five trials. FIG. 15 illustrates results of BM25 (Reference document 6) obtained by a conventional method (information search only), IR(STL), and IR(MTL) according to the present invention. STL stands for single-task learning for comparison with MTL (multi-task learning).

As illustrated in FIG. 15, regarding the information search, IR(MTL) according to the present invention exhibited better performance than both IR(STL) and BM25.

FIG. 16 shows results of the reading comprehension for the SQuAD development set, presented by a mean of five trials. FIG. 16 illustrates results of BiDAF obtained by a conventional method (reading comprehension technique only, Non-Patent Document 1), RC(STL), and RC(MTL) according to the present invention.

As illustrated in FIG. 16, also regarding the reading comprehension, RC(MTL) according to the present invention exhibited better performance than both RC(STL) and BiDAF.

Note that as illustrated in FIGS. 15 and 16, the MTL approach according to the present invention enables precise information search without deteriorating the precision of reading comprehension.

FIG. 17 illustrates results of the question answering with respect to the SQuAD development set. Here, Single Model presents a mean of 5 trials, and Ensemble Model is constituted with 5 single models. FIG. 17 illustrates results of BM25+RC(STL) as a conventional method (coupling of an information search technique and a reading comprehension technique) and the method according to the present invention (E2E-QA).

As illustrated in FIG. 17, the method according to the present invention exhibited significantly improved performance as compared with the method according to coupling of the information search technique and the reading comprehension technique.

Summary of Embodiments

As described above, according to the first embodiment, a question answering device is provided that includes a processing unit configured to receive as input a document and a question, and to execute processing to output an answer range as a range of a string that can be an answer to the question from the document, or an answer suitability with respect to the answer range by using neural networks, wherein the neural networks include a first neural network configured to calculate the answer range and a second neural network configured to calculate the answer suitability, and between the first neural network and the second neural network, part of layers constituting both neural networks is shared.

The first neural network described above includes, for example, a word embedding layer 200, a contextual embedding layer 300, an attention flow layer 400, a modeling layer 500, and a reading comprehension layer 600. The second neural network includes, for example, the word embedding layer 200, the contextual embedding layer 300, the attention flow layer 400, the modeling layer 500, and an information retrieval layer 700.

The processing unit may obtain the answer range and the answer suitability for each document in an input group of documents, to obtain a string as an answer candidate from the answer range, and the question answering device may further include an answer determination unit configured to sum up the answer suitabilities for documents having the same string extracted as the answer candidate, and to output the answer candidate having the largest sum total as the answer.

The processing unit may generate a matching matrix based on the document and the question, by the shared part of the layers constituting both of the neural networks; calculate the answer range by the first neural network, and calculate the answer suitability by the second neural network, based on the matching matrix.

Also, according to the first embodiment, a question answering device is provided that includes a processing unit configured to receive as input a document and a question, and to execute processing to output an answer range as a range of a string that can be an answer to the question from the document, or an answer suitability with respect to the answer range, by using neural networks; and a parameter learning unit, wherein the neural networks include a first neural network configured to calculate the answer range, and a second neural network configured to calculate the answer suitability, and between the first neural network and the second neural network, part of layers constituting both neural networks is shared, and wherein the parameter learning unit is configured to learn parameters of the neural networks from outputs from the neural networks and training data as right answers.

Also, according to the first embodiment, a program for causing a computer to function as the respective units in the question answering device, is provided.

Also, according to the first embodiment, an information processing device is provided that includes a processing unit configured to receive as input a pair of a document and a question, and to execute processing to output an answer range as a range of a string that can be an answer to the question in the document, or an answer suitability of the document with respect to the question, wherein the processing unit includes a first neural network configured to calculate the answer range, and a second neural network configured to calculate the answer suitability, and between the first neural network and the second neural network, part of layers constituting both neural networks is shared.

The first neural network described above includes, for example, a word embedding layer 200, a contextual embedding layer 300, an attention flow layer 400, a modeling layer 500, and a reading comprehension layer 600. The second neural network includes, for example, the word embedding layer 200, the contextual embedding layer 300, the attention flow layer 400, the modeling layer 500, and an information retrieval layer 700.

The processing unit may obtain, for each document in an input group of documents, the answer range and the answer suitability of the document with respect to the question.

The processing unit may obtain the answer range and the answer suitability for each document in the input group of documents, to obtain a string as an answer candidate from the answer range, and the information processing device may further include an answer score calculation unit configured to calculate an answer candidate score, based on answer suitabilities of documents having the same string extracted as the answer candidate.

The answer score calculation unit may calculate the answer candidate score by a sum total of the answer suitabilities, a weighted mean of the answer suitabilities, or a weighted sum of the answer suitabilities for the document having the same string extracted as the answer candidate.

The processing unit may generate a matching matrix based on the document and the question, by the shared part of the layers constituting both of the neural networks; calculate the answer range by the first neural network, and calculate the answer suitability by the second neural network, based on the matching matrix.

Also, according to the first embodiment, an information processing device is provided that includes a processing unit configured to receive as input a pair of a document and a question, and to execute processing to output an answer range as a range of a string that can be an answer to the question in the document, or an answer suitability of the document with respect to the question; and a parameter learning unit, wherein the processing unit includes a first neural network configured to calculate the answer range, and a second neural network configured to calculate the answer suitability, and between the first neural network and the second neural network, part of layers constituting both neural networks is shared, wherein the parameter learning unit is configured to learn parameters of the neural networks from outputs from the neural networks and training data as right answers, and wherein the training data as the right answers is constituted with tuples of question, document, answer range, and answer suitability.

Also, according to the first embodiment, a program for causing a computer to function as the respective units in the information processing device, is provided.

Also, according to the second embodiment, a question answering device is provided that includes a processing unit configured to receive as input a document and a question, and to execute processing to output an answer range or an answer paragraph as a range of a string that can be an answer to the question from the document, or an answer suitability, by using neural networks, wherein the neural networks include a first neural network configured to calculate the answer range, a second neural network configured to calculate the answer paragraph, and a third neural network configured to calculate the answer suitability, and among the first neural network, the second neural network, and the third neural network, part of the layers constituting these neural networks is shared.

The first neural network described above includes, for example, a word embedding layer 210, a contextual embedding layer 310, an attention flow layer 410, a modeling layer 510, and a part of a reading comprehension layer 610 configured to calculate the answer range. The second neural network described above includes, for example, the word embedding layer 210, the contextual embedding layer 310, the attention flow layer 410, the modeling layer 510, and a part of the reading comprehension layer 610 configured to calculate the answer paragraph. The third neural network includes, for example, the word embedding layer 210, the contextual embedding layer 310, the attention flow layer 410, the modeling layer 510, and an information retrieval layer 710.

The question answering device may further include a question answering unit configured to output a most probable answer range or a most probable answer paragraph as an answer from a document having a highest answer suitability obtained by the processing unit from among an input group of documents, or to output the document having the highest answer suitability as the answer.

The processing unit may generate a matching matrix based on the document and the question, by the shared part of the layers; and calculate the answer range by the first neural network, calculate the answer paragraph by the second neural network, and calculate the answer suitability by the third neural network, based on the matching matrix.

Also, according to the second embodiment, a question answering device is provided that includes a processing unit configured to receive as input a document and a question, and to execute processing to output an answer range or an answer paragraph as a range of a string that can be the answer to the question from the document, or an answer suitability, by using neural networks; and a parameter learning unit, wherein the neural networks include a first neural network configured to calculate the answer range, a second neural network configured to calculate the answer paragraph, and a third neural network configured to calculate the answer suitability, and among the first neural network, the second neural network, and the third neural network, part of the layers constituting these neural networks is shared, and wherein the parameter learning unit is configured to learn parameters of the neural networks from outputs from the neural networks and training data as right answers.

Also, according to the second embodiment, a program for causing a computer to function as the respective units in the question answering device is provided.

Also, according to the second embodiment, an information processing device is provided that is configured such that in the information processing device described earlier, the first neural network is constituted with multiple neural networks each of which corresponds to one of multiple ranges as the answer ranges indicating answers at multiple levels of granularity, and between the second neural network and the multiple neural networks, part of the layers constituting these neural networks is shared.

The first neural network described above includes, for example, the word embedding layer 210, the contextual embedding layer 310, the attention flow layer 410, the modeling layer 510, and the information retrieval layer 710. Also, the multiple neural networks include, for example, a neural network including the word embedding layer 210, the contextual embedding layer 310, the attention flow layer 410, the modeling layer 510, and the part of the reading comprehension layer 610 configured to calculate the answer range; and a neural network including the word embedding layer 210, the contextual embedding layer 310, the attention flow layer 410, the modeling layer 510, and the part of the reading comprehension layer 610 configured to calculate the answer paragraph.

In the information processing device, the processing unit may further include a question answering unit 106 configured to output a range having a most appropriate level of granularity as the answer range, based on the multiple ranges indicating answers having multiple levels of granularity calculated by the multiple neural networks. The multiple ranges indicating answers having the multiple levels of granularity may include, for example, the answer range and the answer paragraph. The range having the most appropriate level of granularity corresponds to one of, for example, a phrase, a paragraph, and a document.

Note that supplementary notes are added to "multiple ranges indicating answers of multiple levels of granularity" and a "range having appropriate level of granularity" described above. The question answering device of the second embodiment as an example of the information processing device according to the present invention is constituted with a first neural network configured to calculate an answer range and a second neural network configured to calculate an answer suitability. In addition, the first neural network is constituted with two neural networks corresponding to two entities of "phrase" and "paragraph", respectively, as "multiple ranges indicating answers of multiple levels of granularity". In this configuration, it is possible to return one of the three entities of "phrase, paragraph, and document" as an "answer range" being a "range having appropriate level of granularity".

Specifically, as described earlier, in the second embodiment, the following processing is performed for a document having a high answer suitability.

(1) Either one of "answer range" or "answer paragraph" is output if determined as appropriate based on the estimated scores of "answer range" and "answer paragraph" (based on Formula 45 or Formula 48 described earlier).

(2) If it is determined that both "answer range" and "answer paragraph" are not appropriate as the range indicating the answer, the document is output.

The processing unit may generate a matching matrix based on the document and the question, by the shared part of the layers constituting the first neural network and the multiple neural networks; calculate the answer suitability by the second neural network, and calculate multiple ranges indicating answers at the multiple levels of granularity by the multiple neural networks, based on the matching matrix.

Also, according to the second embodiment, a program for causing a computer to function as the respective units in the information processing device, is provided.

The present Description discloses at least the following matters.

(Matter 1)

A question answering device including a processing unit configured to receive as input a document and a question, and to execute processing to output an answer range as a range of a string that can be an answer to the question from the document, or an answer suitability with respect to the answer range, by using neural networks, wherein the neural networks include a first neural network configured to calculate the answer range, and a second neural network configured to calculate the answer suitability, and between the first neural network and the second neural network, part of layers constituting both neural networks is shared.

(Matter 2)

The question answering device as described in Matter 1, wherein the processing unit obtains the answer range and the answer suitability for each document in an input group of documents, to obtain a string as an answer candidate from the answer range, and wherein the question answering device further includes an answer determination unit configured to sum up the answer suitabilities for documents having the same string extracted as the answer candidate, and to output the answer candidate having the largest sum total as the answer.

(Matter 3)

The question answering device as described in Matter 1 or 2, wherein the processing unit generates a matching matrix based on the document and the question, by the shared part of the layers constituting both of the neural networks; and calculate the answer range by the first neural network, and calculate the answer suitability by the second neural network, based on the matching matrix.

(Matter 4)

A question answering device including a processing unit configured to receive as input a document and a question, and to execute processing to output an answer range as a range of a string that can be an answer to the question from the document, or an answer suitability with respect to the answer range, by using neural networks; and a parameter learning unit, wherein the neural networks include a first neural network configured to calculate the answer range, and a second neural network configured to calculate the answer suitability, and between the first neural network and the second neural network, part of layers constituting both neural networks is shared, and wherein the parameter learning unit is configured to learn parameters of the neural networks from outputs from the neural networks and training data as right answers.

(Matter 5)

A program for causing a computer to function as the respective units in the question answering device as described in any one of Matters 1 to 4.

(Matter 6)

A question answering method executed by a question answering device that includes a processing unit configured to receive as input a document and a question, and to execute processing to output an answer range as a range of a string that can be an answer to the question from the document, or an answer suitability with respect to the answer range, by using neural networks, wherein the neural networks include a first neural network configured to calculate the answer range, and a second neural network configured to calculate the answer suitability, and between the first neural network and the second neural network, part of layers constituting both neural networks is shared, the method including:

a step executed by the processing unit for generating a matching matrix based on the document and the question, by the shared part of the layers constituting both of the neural networks; and a step executed by the processing unit for calculating the answer range or the answer suitability based on the matching matrix.

(Matter 7)

A question answering device including a processing unit configured to receive as input a document and a question, and to execute processing to output an answer range or an answer paragraph as a range of a string that can be an answer to the question from the document, or an answer suitability, by using neural networks, wherein the neural networks include a first neural network configured to calculate the answer range, a second neural network configured to calculate the answer paragraph, and a third neural network configured to calculate the answer suitability, and among the first neural network, the second neural network, and the third neural network, part of the layers constituting these neural networks is shared.

(Matter 8)

The question answering device as described in Matter 7, further including a question answering unit configured to output a most probable answer range or a most probable answer paragraph as the answer from a document having the highest answer suitability obtained by the processing unit from among the input group of documents, or to output the document having the highest answer suitability as the answer.

(Matter 9)

The question answering device as described in Matter 7 or 9, wherein the processing unit generates a matching matrix based on the document and the question, by the shared part of the layers constituting the first neural network, the second neural network, and the third neural network, and calculates the answer range by the first neural network, calculates the answer paragraph by the second neural network, and calculates the answer suitability by the third neural network, based on the matching matrix.

(Matter 10)

A question answering device including a processing unit configured to receive as input a document and a question, and to execute processing to output an answer range as a range of a string that can be an answer to the question from the document, or an answer suitability with respect to the answer range, by using neural networks; and a parameter learning unit, wherein the neural networks include a first neural network configured to calculate the answer range, a second neural network configured to calculate the answer paragraph, and a third neural network configured to calculate the answer suitability, and among the first neural network, the second neural network, and the third neural network, part of the layers constituting these neural networks is shared, and wherein the parameter learning unit is configured to learn parameters of the neural networks from outputs from the neural networks and training data as right answers.

(Matter 11)

A program for causing a computer to function as the respective units in the question answering device as described in any one of Matters 7 to 10.

(Matter 12)

A question answering method executed by a question answering device including a processing unit configured to receive as input a document and a question, and to execute processing to output an answer range or an answer paragraph as a range of a string that can be an answer to the question from the document, or an answer suitability, by neural networks, wherein the neural networks include a first neural network configured to calculate the answer range, a second neural network configured to calculate the answer paragraph, and a third neural network configured to calculate the answer suitability, and among the first neural network, the second neural network, and the third neural network, part of the layers constituting these neural networks is shared, the method including:

a step executed by the processing unit for generating a matching matrix based on the document and the question in the shared part of the layers; and a step executed by the processing unit for calculating the answer range or the answer suitability based on the matching matrix.

The present invention is not limited to the above embodiments, and various changes and applications can be made within the scope of the claims.

REFERENCES

Reference 1: Tomas Mikolov, Ilya Sutskever, Kai Chen, Greg Corrado, and Jeffrey Dean. Distributed Representations of Words and Phrases and their Compositionality. In Proceedings of NIPS, 2013.

Reference 2: Hochreiter, S., and Schmidhuber, J. 1997. Long short-term memory. Neural Computation 9 (8): 1735-1780.

Reference 3: Rajpurkar, P.; Zhang, J.; Lopyrev, K.; and Liang, P. 2016. Squad: 100,000+ questions for machine comprehension of text. In EMNLP, 2383-2392.

Reference 4: Craswell, N. 2009b. Success at n. In Encyclopedia of Database Systems. 2875-2876.

Reference 5: Craswell, N. 2009a. Mean reciprocal rank. In Encyclopedia of Database Systems. 1703.

Reference 6: Robertson, S. E., and Walker, S. 1994. Some simple effective approximations to the 2-poisson model for probabilistic weighted retrieval. In SIGIR, 232-241

The present patent application claims priority based on Japanese Patent Application No. 2017-232189 filed on Dec. 1, 2017, and Japanese Patent Application No. 2017-233745 filed on Dec. 5, 2017, and the entire contents of Japanese Patent Application No. 2017-232189 and Japanese Patent Application No. 2017-233745 are incorporated herein by reference.

LIST OF REFERENCE SYMBOLS

100, 110 question answering device
101, 111 word vector storage unit
102, 112 word sequence vectorizing unit
103, 113 word sequence matching unit
104, 114 answer range output unit
105, 115 answer suitability output unit
106, 116 question answering unit
107, 117 parameter learning unit
118 answer paragraph output unit
200, 210 word embedding layer
300, 310 contextual embedding layer
400, 410 attention flow layer
500, 510 modeling layer
600, 610 reading comprehension layer
700, 710 information retrieval layer
150 drive unit
150 recording medium
152 auxiliary storage unit
153 memory unit
154 CPU
155 interface unit
156 display unit
157 input unit

The invention claimed is:

1. An information processing device, comprising:
a processing circuitry configured to receive as input a document and a question, and to execute processing to output an answer range as a range of a string that can be an answer to the question in the document, the range being defined with position numbers of start and end words in the document, or an answer suitability of the document with respect to the question, by using neural networks, the answer suitability indicating a degree of a document as being answerable to the question,
wherein the processing circuitry includes a first neural network configured to calculate the answer range, and a second neural network configured to calculate the answer suitability, and between the first neural network and the second neural network, both neural networks share a plurality of layers that process attributes of the inputted document and question, while only the first neural network includes a reading comprehension layer as a final layer that outputs the answer range and only the second neural network includes an information retrieval layer as a final layer that outputs the answer suitability.

2. The information processing device as claimed in claim 1, wherein the processing circuitry obtains, for each document in an input group of documents, the answer range and the answer suitability of the document with respect to the question.

3. The information processing device as claimed in claim 1,
wherein the processing circuitry obtains the answer range and the answer suitability for each document in an input group of documents, to obtain a string as an answer candidate from the answer range, and
wherein the processing circuitry is further configured, based on answer suitabilities for documents having a same string extracted as the answer candidate, to calculate an answer candidate score for the string obtained for said each document.

4. The information processing device as claimed in claim 3, wherein the processing circuitry calculates the answer candidate score by a sum total of the answer suitabilities, a weighted mean of the answer suitabilities, or a weighted sum of the answer suitabilities for the documents having the same string extracted as the answer candidate.

5. The information processing device as claimed in claim 1, wherein the processing circuitry generates a matching matrix based on the document and the question, by the shared part of the layers constituting said both neural networks, and
calculates the answer range by the first neural network, and calculates the answer suitability by the second neural network, based on the matching matrix.

6. An information processing device, comprising:
a processing circuitry configured to receive as input a document and a question, and to execute processing to output an answer range as a range of a string that can be an answer to the question from the document, the range being defined with position numbers of start and end words in the document, or an answer suitability with respect to the answer range, by using neural networks, the answer suitability indicating a degree of a document as being answerable to the question,
wherein the processing circuitry includes a first neural network configured to calculate the answer range, and a second neural network configured to calculate the answer suitability, and between the first neural network and the second neural network, both neural networks share a plurality of layers that process attributes of the inputted document and question, while only the first neural network includes a reading comprehension layer as a final layer that outputs the answer range and only the second neural network includes an information retrieval layer as a final layer that outputs the answer suitability,
wherein the processing circuitry is further configured to learn parameters of said both neural networks from outputs from said both neural networks and training data as right answers, and
wherein the training data as the right answers is constituted with tuples of question, document, answer range, and answer suitability.

7. The information processing device as claimed in claim 1, wherein the first neural network is constituted with a plurality of neural networks each of which corresponds to one of a plurality of ranges as the answer range indicating answers at a plurality of levels of granularity, and between the second neural network and the plurality of neural networks, part of the layers constituting these neural networks is shared.

8. The information processing device as claimed in claim 7, wherein the processing circuitry is further configured to output a range having a most appropriate level of granularity as the answer range, based on the plurality of ranges indicating the answers having the plurality of levels of granularity calculated by the plurality of neural networks.

9. The information processing device as claimed in claim 8, wherein the range having the most appropriate level of granularity corresponds to one of a phrase, a paragraph, and a document.

10. A non-transitory computer-readable recording medium having a program stored thereon for causing a computer to function as the processing circuitry in the information processing device as claimed in claim 1.

11. An information processing method executed by an information processing device including a processing circuitry configured to receive as input a pair of a document and a question, and to execute processing to output an answer range as a range of a string that can be an answer to the question in the document, the range being defined with position numbers of start and end words in the document, or an answer suitability of the document with respect to the question, the answer suitability indicating a degree of a document as being answerable to the question,
wherein the processing circuitry includes a first neural network configured to calculate the answer range, and a second neural network configured to calculate the answer suitability, and between the first neural network and the second neural network, both neural networks share a plurality of layers that process attributes of the inputted document and question, while only the first neural network includes a reading comprehension layer as a final layer that outputs the answer range and only the second neural network includes an information retrieval layer as a final layer that outputs the answer suitability,
the method comprising:
a step executed by the processing circuitry for generating a matching matrix based on the document and the question, by the shared part of the layers constituting said both neural networks; and
a step executed by the processing circuitry for calculating the answer range by the first neural network based on the matching matrix, or calculating the answer suitability by the second neural network based on the matching matrix.

12. The information processing method as claimed in claim 11,
wherein the first neural network is constituted with a plurality of neural networks each of which corresponds to one of a plurality of ranges as the answer range indicating answers at a plurality of levels of granularity, and between the second neural network and the plurality of neural networks, part of the layers constituting these neural networks is shared.

13. A non-transitory computer-readable recording medium having a program stored thereon for causing a computer to function as the processing circuitry in the information processing device as claimed in claim 6.

* * * * *